US012795463B2

(12) United States Patent
Uchino et al.

(10) Patent No.: US 12,795,463 B2
(45) Date of Patent: Nov. 10, 2026

(54) CELLULAR CONNECTION OVER NON-CELLULAR ACCESS VIA GATEWAY

(71) Applicant: QUALCOMM Incorporated, San Diego, CA (US)

(72) Inventors: Toru Uchino, Zushi (JP); Bharat Shrestha, San Diego, CA (US); Umesh Phuyal, San Diego, CA (US); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 18/459,400

(22) Filed: Aug. 31, 2023

(65) Prior Publication Data

US 2025/0081046 A1 Mar. 6, 2025

(51) Int. Cl.
*H04W 36/00* (2009.01)
*H04W 76/10* (2018.01)
*H04W 88/16* (2009.01)

(52) U.S. Cl.
CPC ... *H04W 36/0033* (2013.01); *H04W 36/0072* (2013.01); *H04W 36/0085* (2018.08); *H04W 76/10* (2018.02); *H04W 88/16* (2013.01)

(58) Field of Classification Search
CPC ....... H04W 36/00222; H04W 36/0033; H04W 36/0038; H04W 36/0072; H04W 36/0085; H04W 76/10; H04W 76/16; H04W 88/16
See application file for complete search history.

(56) References Cited

U.S. PATENT DOCUMENTS

| | | | | |
|---|---|---|---|---|
| 8,805,370 | B1 * | 8/2014 | Kannan | H04W 36/00226 455/445 |
| 9,210,625 | B1 * | 12/2015 | Lovlekar | H04W 24/08 |
| 9,532,236 | B2 * | 12/2016 | Gunnarsson | H04B 7/155 |
| 9,622,067 | B1 * | 4/2017 | Velusamy | H04W 24/04 |
| 9,906,992 | B1 * | 2/2018 | Youtz | H04W 36/0033 |
| 10,051,525 | B1 * | 8/2018 | Marupaduga | H04W 36/26 |
| 10,206,232 | B2 * | 2/2019 | Novlan | H04B 7/2606 |
| 10,211,907 | B1 * | 2/2019 | Oroskar | H04L 43/16 |
| 10,219,305 | B2 * | 2/2019 | Shalev | H04W 36/14 |
| 10,361,953 | B1 * | 7/2019 | Bonn | H04L 45/74 |
| 10,433,217 | B2 * | 10/2019 | Kilgour | H04W 48/12 |
| 11,051,172 | B2 * | 6/2021 | Avula | H04W 76/14 |

(Continued)

FOREIGN PATENT DOCUMENTS

| | | |
|---|---|---|
| WO | 2020186092 A2 | 9/2020 |
| WO | 2022026647 A1 | 2/2022 |

OTHER PUBLICATIONS

International Search Report and Written Opinion—PCT/US2024/040907—ISA/EPO—Nov. 14, 2024.

*Primary Examiner* — Dung B Huynh
(74) *Attorney, Agent, or Firm* — Harrity & Harrity, LLP

(57) ABSTRACT

Various aspects of the present disclosure generally relate to wireless communication. In some aspects, a user equipment (UE) may establish a first non-cellular connection with a first access point. The UE may transmit, to a first gateway entity via the first access point, a connection setup request for a first cellular connection between the UE and a first network entity. The UE may receive a connection setup message from the first gateway entity via the first access point. The UE may transmit a connection complete message to the first gateway entity via the first access point. Numerous other aspects are described.

30 Claims, 24 Drawing Sheets

(56) References Cited

U.S. PATENT DOCUMENTS 11,153,865 B2 * 10/2021 Park ...................... H04W 72/51
11,838,151 B1 * 12/2023 Jones .................. H04L 25/0224
11,853,310 B1 * 12/2023 Frison ............... G06F 16/24566
11,877,341 B2 * 1/2024 Xu ........................ H04W 76/11
12,348,357 B1 * 7/2025 Overcash ............ H04L 41/0663
2006/0040666 A1 * 2/2006 Narasimha ........ H04W 36/1446 455/436
2006/0046728 A1 * 3/2006 Jung .................. H04W 36/144 455/445
2006/0052113 A1 * 3/2006 Ophir ..................... H04W 8/02 455/435.1
2006/0072542 A1 * 4/2006 Sinnreich ............ H04L 12/2854 370/351
2006/0168111 A1 * 7/2006 Gidwani ............... H04W 76/11 709/228
2006/0291419 A1 * 12/2006 McConnell ............. H04L 65/80 455/436
2007/0049276 A1 * 3/2007 Rimoni ............. H04W 36/1446 455/436
2007/0249352 A1 * 10/2007 Song .................. H04W 12/062 455/436
2007/0268859 A1 * 11/2007 Yao ..................... H04W 36/304 370/328
2008/0192925 A1 * 8/2008 Sachs .................. H04W 12/033 380/29
2009/0111458 A1 * 4/2009 Fox ..................... H04W 84/042 455/422.1
2009/0303918 A1 * 12/2009 Ma ........................ H04L 5/0035 370/329
2010/0008259 A1 * 1/2010 Yoon ..................... H04W 36/08 370/254
2010/0041387 A1 * 2/2010 Khetawat ................ H04W 8/02 455/422.1
2010/0041405 A1 * 2/2010 Gallagher ............... H04W 8/02 455/436
2010/0048216 A1 * 2/2010 Sundarraman .... H04W 36/0011 455/444
2010/0144316 A1 * 6/2010 Piercy ................... H04W 12/06 455/411
2010/0260096 A1 * 10/2010 Ulupinar .............. H04B 7/2606 370/315
2011/0002304 A1 * 1/2011 Lee ....................... H04W 36/02 370/331
2011/0165896 A1 * 7/2011 Stromberg ......... G06Q 20/3278 455/466
2011/0276947 A1 * 11/2011 Delbaere ............... G06F 30/367 717/125
2011/0319066 A1 * 12/2011 Chou .................... H04W 88/04 455/422.1
2012/0008578 A1 * 1/2012 Kant ................. H04W 36/0022 370/329
2012/0100852 A1 * 4/2012 Horn ................. H04W 36/0083 455/436
2012/0115467 A1 * 5/2012 Conte ............... H04W 52/0225 455/434
2012/0120919 A1 * 5/2012 Shu ................... H04W 36/0038 370/331
2012/0147830 A1 * 6/2012 Lohr ..................... H04L 1/1854 370/329
2012/0178466 A1 * 7/2012 You ....................... H04W 60/00 455/450
2012/0263096 A1 * 10/2012 Masini ................. H04B 7/2606 370/315
2013/0016649 A1 * 1/2013 Damnjanovic ....... H04W 88/04 370/315
2013/0029639 A1 * 1/2013 Lee ....................... H04W 12/06 455/411
2013/0070739 A1 * 3/2013 McCann ............... H04W 48/16 370/338
2013/0083721 A1 * 4/2013 Wu ................... H04W 36/0064 370/315
2013/0195012 A1 * 8/2013 Laitila ................... H04W 8/082 370/328
2013/0310028 A1 * 11/2013 Miyagawa .............. H04W 8/02 455/433
2013/0336287 A1 * 12/2013 Abraham ............ H04W 12/069 370/331
2014/0082697 A1 * 3/2014 Watfa .................. H04L 63/0485 726/3
2014/0086163 A1 * 3/2014 Yang ..................... H04W 76/10 370/329
2014/0126460 A1 * 5/2014 Bienas ................ H04W 74/002 370/315
2014/0169265 A1 * 6/2014 Park ...................... H04W 40/36 370/315
2014/0293958 A1 * 10/2014 Teyeb ............... H04W 36/0072 370/331
2014/0331272 A1 * 11/2014 Gupta ................... H04W 4/021 726/1
2014/0337935 A1 * 11/2014 Liu ......................... H04L 63/10 726/4
2014/0341085 A1 * 11/2014 Suryavanshi ....... H04L 65/1063 370/260
2015/0003435 A1 * 1/2015 Horn ..................... H04L 5/0058 370/338
2015/0029866 A1 * 1/2015 Liao ...................... H04W 48/14 370/254
2015/0049707 A1 * 2/2015 Vajapeyam ........... H04W 24/10 370/329
2015/0141015 A1 * 5/2015 Zhang ............... H04W 36/0061 455/436
2015/0172964 A1 * 6/2015 Huang ............. H04W 36/0033 455/437
2015/0208310 A1 * 7/2015 Taneja ................ H04B 17/318 370/331
2015/0223284 A1 * 8/2015 Jain ....................... H04W 88/02 370/329
2015/0282026 A1 * 10/2015 Gupta ................... H04W 68/00 370/331
2015/0319686 A1 * 11/2015 Hedberg ............... H04W 48/20 370/329
2015/0365860 A1 * 12/2015 Yu ......................... H04W 36/22 455/444
2015/0373600 A1 * 12/2015 Malkamäki ........... H04W 36/22 370/331
2015/0373608 A1 * 12/2015 Zhu .................. H04W 36/0011 370/252
2016/0007247 A1 * 1/2016 Lee .................. H04W 36/0066 370/331
2016/0014127 A1 * 1/2016 Mohebbi ............... H04W 48/18 455/411
2016/0037406 A1 * 2/2016 Centonza ............. H04B 17/345 370/332
2016/0050605 A1 * 2/2016 Kim .................. H04W 28/0865 370/331
2016/0066245 A1 * 3/2016 Vikberg .............. H04L 12/1407 370/331
2016/0080981 A1 * 3/2016 Wang ................ H04W 36/1446 370/331
2016/0095037 A1 * 3/2016 Morita ................ H04W 12/069 370/331
2016/0105883 A1 * 4/2016 Ghai ................... H04L 12/6418 370/329
2016/0127148 A1 * 5/2016 Xue .................... H04L 65/1036 370/254
2016/0142963 A1 * 5/2016 Salkintzis ............. H04L 45/308 370/329
2016/0143080 A1 * 5/2016 Enomoto .............. H04W 8/005 370/329
2016/0157164 A1 * 6/2016 Lee ....................... H04W 48/16 370/329
2016/0173297 A1 * 6/2016 Kanugovi ............. H04W 40/02 370/328
2016/0219475 A1 * 7/2016 Kim ...................... H04W 76/19
2016/0227597 A1 * 8/2016 Cho ...................... H04W 76/30
2016/0255662 A1 * 9/2016 Kotecha ................ H04W 76/12 370/254

(56) References Cited

U.S. PATENT DOCUMENTS

2016/0262162 A1* 9/2016 Calin .................. H04W 74/002
2016/0269355 A1* 9/2016 Lee ..................... H04L 61/5007
2016/0277956 A1 9/2016 Lindheimer et al.
2016/0295385 A1* 10/2016 Wang ...................... H04W 4/90
2016/0295521 A1* 10/2016 Grayson ............. H04W 64/006
2016/0373992 A1* 12/2016 Jung .................... H04W 36/04
2017/0006523 A1* 1/2017 Mitsui ................... H04W 48/18
2017/0013513 A1* 1/2017 Agarwal ............... H04W 36/22
2017/0034857 A1* 2/2017 Berggren ............ H04L 61/5007
2017/0034860 A1* 2/2017 Berggren .............. H04W 48/00
2017/0094572 A1* 3/2017 Yang ..................... H04W 76/27
2017/0094700 A1* 3/2017 Hong .................... H04W 48/18
2017/0195883 A1* 7/2017 Kwok ..................... H04W 4/14
2017/0237783 A1* 8/2017 Yang ..................... H04W 76/15 370/331
2017/0265241 A1* 9/2017 Fujishiro ............... H04W 16/14
2017/0303189 A1* 10/2017 Hampel ................ H04W 48/20
2017/0325146 A1* 11/2017 Breuer .................. H04W 48/20
2017/0325151 A1* 11/2017 Fujishiro ............. H04W 36/304
2017/0347278 A1* 11/2017 Gonzalez .............. H04W 76/10
2017/0374542 A1* 12/2017 Ryu ........................ H04W 8/08
2017/0374610 A1* 12/2017 Kim ...................... H04W 48/18
2018/0007604 A1* 1/2018 Pillay-Esnault ...... H04W 36/26
2018/0027458 A1* 1/2018 Mohan .................. H04L 63/061 370/331
2018/0041921 A1* 2/2018 Kojima ............. H04W 28/0842
2018/0092085 A1* 3/2018 Shaheen ........... H04W 36/0094
2018/0146375 A1* 5/2018 Pawar ................. H04W 12/062
2018/0199390 A1* 7/2018 Hahn ................... H04B 7/2606
2018/0213458 A1* 7/2018 Belghoul .............. H04W 36/22
2018/0213461 A1* 7/2018 Grayson ................. H04L 45/24
2018/0213466 A1* 7/2018 Kotecha ................ H04W 60/00
2018/0213584 A1* 7/2018 Yang ................. H04W 28/0861
2018/0288823 A1* 10/2018 Hampel .................. H04L 45/74
2018/0302785 A1* 10/2018 Larmo .................. H04W 76/27
2018/0332659 A1* 11/2018 Hwang ................. H04W 24/02
2018/0352420 A1* 12/2018 Jactat .................... H04W 76/16
2018/0376530 A1* 12/2018 Fujishiro ............... H04W 88/06
2019/0021130 A1* 1/2019 Kim ...................... H04W 72/23
2019/0053092 A1* 2/2019 Chun .................... H04W 76/27
2019/0059015 A1* 2/2019 Lee ................... H04W 28/0205
2019/0059119 A1* 2/2019 Hapsari ................. H04W 76/10
2019/0124710 A1* 4/2019 Stattin ................... H04W 76/19
2019/0149990 A1* 5/2019 Wang ................ H04W 12/0471 370/329
2019/0166526 A1* 5/2019 Xu .......................... H04L 67/12
2019/0174382 A1* 6/2019 Yu ..................... H04W 36/0027
2019/0190587 A1* 6/2019 Ma ........................ H04W 76/14
2019/0313244 A1* 10/2019 Wang ................ H04W 36/0033
2019/0313280 A1* 10/2019 Gottwerth ............... H04L 67/52
2019/0350031 A1* 11/2019 Bedekar ................ H04W 76/10
2019/0373538 A1* 12/2019 Tao ................... H04W 12/0431
2020/0008120 A1* 1/2020 Beck ................... H04W 36/026
2020/0029297 A1* 1/2020 Baek ..................... H04W 76/11
2020/0059292 A1* 2/2020 Kim .................... H04W 84/047
2020/0059845 A1* 2/2020 Hong ................ H04W 36/0022
2020/0084691 A1* 3/2020 Wallentin .............. H04W 76/27
2020/0084810 A1* 3/2020 Gundavelli ........... H04W 12/04
2020/0128449 A1* 4/2020 Faus Gregori .. H04W 36/00222
2020/0137679 A1* 4/2020 Poovappa ............. H04M 7/006
2020/0178343 A1* 6/2020 Kim ...................... H04W 76/27
2020/0186990 A1* 6/2020 Jacobs .................. H04L 9/3239
2020/0205212 A1* 6/2020 Rahman .............. H04L 65/1069
2020/0213899 A1* 7/2020 Hong .................... H04W 76/30
2020/0252853 A1* 8/2020 Shi ........................ H04W 40/22
2020/0260264 A1* 8/2020 Hapsari ................. H04W 88/06
2020/0260311 A1* 8/2020 Jung ..................... H04W 76/30
2020/0344629 A1* 10/2020 Kim .................. H04W 52/0209
2020/0351971 A1* 11/2020 Fiorani ................. H04W 72/21
2020/0367091 A1* 11/2020 Xu ........................ H04W 80/02
2020/0396674 A1* 12/2020 Yuan .................... H04W 48/18
2021/0051478 A1* 2/2021 Avula .................. H04W 12/086
2021/0112616 A1* 4/2021 Karandikar ........... H04W 76/16
2021/0195406 A1* 6/2021 Gundavelli ........... H04W 80/04
2021/0195509 A1* 6/2021 Ohlsson .............. H04W 12/037
2021/0204194 A1* 7/2021 Cao ....................... H04W 76/11
2021/0219261 A1* 7/2021 Gundavelli ......... H04W 68/005
2021/0367733 A1* 11/2021 Shi ........................ H04L 5/0094
2021/0410107 A1* 12/2021 Park ...................... H04W 68/02
2022/0030084 A1* 1/2022 Starsinic ............... H04L 67/568
2022/0053401 A1* 2/2022 Foti ................... H04W 36/0022
2022/0053586 A1* 2/2022 Purkayastha ........... H04W 8/20
2022/0061110 A1* 2/2022 Sirotkin ................ H04W 76/12
2022/0086931 A1* 3/2022 Tenny ................... H04W 76/14
2022/0095411 A1* 3/2022 Lin ........................ H04W 76/27
2022/0116841 A1* 4/2022 Tenny ............... H04W 36/0009
2022/0132599 A1* 4/2022 Lee ....................... H04W 36/06
2022/0141749 A1* 5/2022 Luo ..................... H04W 36/305 370/331
2022/0159753 A1* 5/2022 Kuo ...................... H04W 76/14
2022/0174758 A1* 6/2022 Pan ....................... H04W 76/19
2022/0182826 A1* 6/2022 Gundavelli ......... H04W 12/086
2022/0191687 A1* 6/2022 Wifvesson ............ H04W 76/12
2022/0240094 A1* 7/2022 Kim .................... H04W 12/106
2022/0240214 A1* 7/2022 Mao .................... H04L 61/4511
2022/0248370 A1* 8/2022 Ryu ....................... H04W 68/02
2022/0261382 A1* 8/2022 Obaidi .................... G06F 21/51
2022/0272774 A1* 8/2022 Teyeb ................. H04W 40/248
2022/0286355 A1* 9/2022 Park .................... H04L 41/0806
2022/0287139 A1* 9/2022 Harris ................... H04W 76/27
2022/0303834 A1* 9/2022 Bertz ................ H04W 36/0033
2022/0322225 A1* 10/2022 Vangala ................ H04W 76/10
2022/0377565 A1* 11/2022 Sevindik ................. H04W 8/24
2023/0025131 A1* 1/2023 Gandhi ............. H04W 28/0958
2023/0030905 A1* 2/2023 Mao ........................ H04W 8/18
2023/0072842 A1* 3/2023 Back ..................... H04W 76/18
2023/0077496 A1* 3/2023 Cheng ................... H04W 76/14 370/328
2023/0087615 A1* 3/2023 Park .................... H04W 72/231 370/329
2023/0098982 A1* 3/2023 Sun ................... H04W 36/0011
2023/0102937 A1* 3/2023 Kim ................. H04W 72/1268 370/329
2023/0108625 A1* 4/2023 Yi ......................... H04W 76/15 370/328
2023/0120096 A1* 4/2023 Kim ...................... H04W 76/19 370/329
2023/0129388 A1* 4/2023 Tenny ................... H04W 24/10 370/329
2023/0134119 A1* 5/2023 Liu ....................... H04W 24/08 370/331
2023/0141487 A1* 5/2023 Chin ................. H04W 52/0235 370/328
2023/0171825 A1* 6/2023 Kuo ...................... H04W 76/19 370/315
2023/0199599 A1* 6/2023 Chen ..................... H04W 40/22 455/436
2023/0209584 A1* 6/2023 Rahman ............ H04W 72/1215 455/452.1
2023/0224986 A1* 7/2023 Wu ......................... H04L 45/28 370/310
2023/0239943 A1* 7/2023 Paladugu .............. H04W 40/22 370/329
2023/0276510 A1* 8/2023 Cheng ................... H04W 48/16 370/329
2023/0308971 A1* 9/2023 Wong .................... H04W 76/11
2023/0328689 A1* 10/2023 Ozturk .................. H04W 76/14 455/458
2023/0354462 A1* 11/2023 Jo ......................... H04W 76/27
2023/0362129 A1* 11/2023 Hall ........................ H04L 61/58
2023/0363035 A1* 11/2023 Zhang ................ H04B 7/15507
2023/0370945 A1* 11/2023 Chen ..................... H04W 40/22
2023/0380003 A1* 11/2023 Agiwal ................. H04W 72/21
2023/0397070 A1* 12/2023 Naik ..................... H04W 60/00
2023/0397100 A1* 12/2023 Chen ..................... H04W 72/25
2024/0015619 A1* 1/2024 Pan ....................... H04W 88/04
2024/0015659 A1* 1/2024 Zhou .................. H04B 7/18513
2024/0031929 A1* 1/2024 Ryu ....................... H04W 48/16
2024/0098584 A1* 3/2024 Sharma ............. H04W 36/0022
2024/0137995 A1* 4/2024 Cai ........................ H04W 76/20
2024/0155370 A1* 5/2024 Horn ..................... H04W 16/28
2024/0155709 A1* 5/2024 Yu ......................... H04W 76/11
2024/0178947 A1* 5/2024 Teyeb ................... H04W 88/04

(56) References Cited

U.S. PATENT DOCUMENTS

2024/0205764 A1* 6/2024 Paladugu ............ H04W 36/035
2024/0205989 A1* 6/2024 Kang .................... H04W 76/27
2024/0267826 A1* 8/2024 Pan ......................... H04W 8/26
2024/0284277 A1* 8/2024 Jeon .................. H04W 36/0072
2024/0298174 A1* 9/2024 Rajadurai ............. H04W 12/06
2024/0314022 A1* 9/2024 Reddy ................. H04L 41/0213
2024/0334248 A1* 10/2024 Barac .................... H04W 40/02
2024/0334320 A1* 10/2024 Liu ....................... H04W 36/13
2024/0334524 A1* 10/2024 Chen ..................... H04W 76/10
2024/0340760 A1* 10/2024 Yao ....................... H04W 48/20
2024/0349379 A1* 10/2024 Freda .................... H04W 76/14
2024/0357690 A1* 10/2024 Li ......................... H04W 76/20
2024/0357691 A1* 10/2024 Li ......................... H04W 24/10
2024/0373310 A1* 11/2024 Fujishiro ............... H04W 76/10
2024/0381130 A1* 11/2024 Zhang ................... H04W 24/10
2024/0388633 A1* 11/2024 Yu ........................... H04L 67/14
2024/0389072 A1* 11/2024 Kamalaraj ............ H04W 48/08
2024/0389180 A1* 11/2024 Li ......................... H04W 76/27
2024/0407030 A1* 12/2024 Xu ...................... H04W 40/248
2024/0414623 A1* 12/2024 Yao ....................... H04W 40/22
2024/0430759 A1* 12/2024 Kim .................. H04W 36/0069
2025/0016711 A1* 1/2025 Tiwari ................ H04W 12/106
2025/0024334 A1* 1/2025 Lu ......................... H04W 76/14
2025/0031114 A1* 1/2025 Mattam ............. H04W 36/0085
2025/0039768 A1* 1/2025 Kuo .................... H04W 40/246
2025/0048285 A1* 2/2025 Kim ...................... H04W 8/183
2025/0048315 A1* 2/2025 Shreevastav .......... H04L 5/0048
2025/0048474 A1* 2/2025 Kim ...................... H04W 76/19
2025/0048475 A1* 2/2025 Kim ...................... H04W 76/27
2025/0056224 A1* 2/2025 Sihotang ............... H04W 12/72
2025/0071657 A1* 2/2025 Liu ....................... H04W 76/14
2025/0071846 A1* 2/2025 Liu ....................... H04W 76/20
2025/0081073 A1* 3/2025 Shrivastava .... H04W 36/00835
2025/0097713 A1* 3/2025 Cuevas Ramirez .. H04W 12/40
2025/0106590 A1* 3/2025 Zhuo ..................... H04W 4/025
2025/0119803 A1* 4/2025 Zhu ................... H04W 36/0072
2025/0133448 A1* 4/2025 Aherrao ................ H04W 12/04
2025/0133605 A1* 4/2025 Liu ....................... H04W 76/20
2025/0168723 A1* 5/2025 Kim .................. H04W 36/0072
2025/0168724 A1* 5/2025 Wu ....................... H04W 36/03
2025/0168920 A1* 5/2025 Shrivastava .......... H04W 76/27
2025/0175873 A1* 5/2025 Sun ....................... H04W 36/18
2025/0184259 A1* 6/2025 Xu ........................ H04W 40/12
2025/0184848 A1* 6/2025 Wu ....................... H04W 76/20
2025/0212264 A1* 6/2025 You ................... H04W 52/0235
2025/0219912 A1* 7/2025 Back ....................... H04L 47/78
2025/0220506 A1* 7/2025 Sharma ................. H04W 28/08
2025/0240254 A1* 7/2025 Zhuo ................... H04L 61/5007
2025/0247427 A1* 7/2025 Wu ....................... H04W 12/69
2025/0261049 A1* 8/2025 Mondet ............. H04W 36/0033
2025/0261066 A1* 8/2025 Mondet ............. H04W 36/0033
2025/0280337 A1* 9/2025 Zhuo ................. H04W 36/0064
2025/0286858 A1* 9/2025 Zhuo ................... H04L 61/5007

* cited by examiner

900

1600

CELLULAR CONNECTION OVER NON-CELLULAR ACCESS VIA GATEWAY

FIELD OF THE DISCLOSURE

Aspects of the present disclosure generally relate to wireless communication and to techniques and apparatuses for establishing a cellular connection over non-cellular access via a gateway.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include establishing a first non-cellular connection (e.g., non-3$^{rd}$ Generation Partnership Project (3GPP) connection,) with a first access point. The method may include transmitting, to a first gateway entity via the first access point, a connection setup request for a first cellular connection (e.g., 3GPP connection) between the UE and a first network entity. The method may include receiving a connection setup message from the first gateway entity via the first access point. The method may include transmitting a connection complete message to the first gateway entity via the first access point.

Some aspects described herein relate to a method of wireless communication performed by a first network entity. The method may include receiving, from a first gateway entity, a connection setup request for a first cellular connection between a UE and the first network entity. The method may include transmitting a connection setup message to the UE via the first gateway entity and a first access point. The method may include receiving a connection complete message from the UE via the first gateway entity and the first access point.

Some aspects described herein relate to a method of wireless communication performed by a first gateway entity. The method may include forwarding, from a UE to a first network entity, a connection setup request for a first cellular connection between the UE and the first network entity. The method may include forwarding a connection setup message from the first network entity to the UE via an access point. The method may include forwarding a connection complete message from the UE to the first network entity.

Some aspects described herein relate to a method of wireless communication performed by a second network entity. The method may include receiving a UE context setup request for a first cellular connection between a UE and the second network entity. The method may include transmitting a UE context response to a first network entity. The method may include receiving a random access channel message from the UE via a first access point and a first gateway entity. The method may include transmitting a random access response to the UE via the first gateway entity and the first access point. The method may include receiving a reconfiguration complete message from the UE via the first access point and the first gateway entity, the reconfiguration complete message being associated with a second cellular connection to the second network entity. The method may include transmitting a transfer message to the first network entity based at least in part on the reconfiguration complete message.

Some aspects described herein relate to an apparatus for wireless communication at a UE. The apparatus may include one or more memories and one or more processors coupled to the one or more memories. The one or more processors may be individually or collectively configured to cause the UE to establish a first non-cellular connection with a first access point. The one or more processors may be individually or collectively configured to cause the UE to transmit, to a first gateway entity via the first access point, a connection setup request for a first cellular connection between the UE and a first network entity. The one or more processors may be individually or collectively configured to cause the UE to receive a connection setup message from the first gateway entity via the first access point. The one or more processors may be individually or collectively configured to cause the UE to transmit a connection complete message to the first gateway entity via the first access point.

Some aspects described herein relate to an apparatus for wireless communication at a first network entity. The apparatus may include one or more memories and one or more processors coupled to the one or more memories. The one or more processors may be individually or collectively configured to cause the first network entity to receive, from a first gateway entity, a connection setup request for a first cellular connection between a UE and the first network entity. The one or more processors may be individually or collectively configured to cause the first network entity to transmit a connection setup message to the UE via the first gateway entity and a first access point. The one or more processors may be individually or collectively configured to cause the first network entity to receive a connection complete message from the UE via the first gateway entity and the first access point.

Some aspects described herein relate to an apparatus for wireless communication at a first gateway entity. The apparatus may include one or more memories and one or more processors coupled to the one or more memories. The one or more processors may be individually or collectively configured to cause the first gateway entity to forward, from a UE to a first network entity, a connection setup request for a first cellular connection between the UE and the first network entity. The one or more processors may be individually or collectively configured to cause the first gateway entity to forward a connection setup message from the first network entity to the UE via an access point. The one or more processors may be individually or collectively configured to cause the first gateway entity to forward a connection complete message from the UE to the first network entity.

Some aspects described herein relate to an apparatus for wireless communication at a second network entity. The apparatus may include one or more memories and one or more processors coupled to the one or more memories. The one or more processors may be individually or collectively configured to cause the second network entity to receive a UE context setup request for a first cellular connection between a UE and the second network entity. The one or more processors may be individually or collectively configured to cause the second network entity to transmit a UE context response to a first network entity. The one or more processors may be individually or collectively configured to cause the second network entity to receive a random access channel message from the UE via a first access point and a first gateway entity. The one or more processors may be individually or collectively configured to cause the second network entity to transmit a random access response to the UE via the first gateway entity and the first access point. The one or more processors may be individually or collectively configured to cause the second network entity to receive a reconfiguration complete message from the UE via the first access point and the first gateway entity, the reconfiguration complete message being associated with a second cellular connection to the second network entity. The one or more processors may be individually or collectively configured to cause the second network entity to transmit a transfer message to the first network entity based at least in part on the reconfiguration complete message.

Some aspects described herein relate to a non-transitory computer-readable medium that stores a set of instructions for wireless communication by a UE. The set of instructions, when executed by one or more processors of the UE, may cause the UE to establish a first non-cellular connection with a first access point. The set of instructions, when executed by one or more processors of the UE, may cause the UE to transmit, to a first gateway entity via the first access point, a connection setup request for a first cellular connection between the UE and a first network entity. The set of instructions, when executed by one or more processors of the UE, may cause the UE to receive a connection setup message from the first gateway entity via the first access point. The set of instructions, when executed by one or more processors of the UE, may cause the UE to transmit a connection complete message to the first gateway entity via the first access point.

Some aspects described herein relate to a non-transitory computer-readable medium that stores a set of instructions for wireless communication by a first network entity. The set of instructions, when executed by one or more processors of the first network entity, may cause the first network entity to receive, from a first gateway entity, a connection setup request for a first cellular connection between a UE and the first network entity. The set of instructions, when executed by one or more processors of the first network entity, may cause the first network entity to transmit a connection setup message to the UE via the first gateway entity and a first access point. The set of instructions, when executed by one or more processors of the first network entity, may cause the first network entity to receive a connection complete message from the UE via the first gateway entity and the first access point.

Some aspects described herein relate to a non-transitory computer-readable medium that stores a set of instructions for wireless communication by a first gateway entity. The set of instructions, when executed by one or more processors of the first gateway entity, may cause the first gateway entity to forward, from a UE to a first network entity, a connection setup request for a first cellular connection between the UE and the first network entity. The set of instructions, when executed by one or more processors of the first gateway entity, may cause the first gateway entity to forward a connection setup message from the first network entity to the UE via an access point. The set of instructions, when executed by one or more processors of the first gateway entity, may cause the first gateway entity to forward a connection complete message from the UE to the first network entity.

Some aspects described herein relate to a non-transitory computer-readable medium that stores a set of instructions for wireless communication by a second network entity. The set of instructions, when executed by one or more processors of the second network entity, may cause the second network entity to receive a UE context setup request for a first cellular connection between a UE and the second network entity. The set of instructions, when executed by one or more processors of the second network entity, may cause the second network entity to transmit a UE context response to a first network entity. The set of instructions, when executed by one or more processors of the second network entity, may cause the second network entity to receive a random access channel message from the UE via a first access point and a first gateway entity. The set of instructions, when executed by one or more processors of the second network entity, may cause the second network entity to transmit a random access response to the UE via the first gateway entity and the first access point. The set of instructions, when executed by one or more processors of the second network entity, may cause the second network entity to receive a reconfiguration complete message from the UE via the first access point and the first gateway entity, the reconfiguration complete message being associated with a second cellular connection to the second network entity. The set of instructions, when executed by one or more processors of the second network entity, may cause the second network entity to transmit a transfer message to the first network entity based at least in part on the reconfiguration complete message.

Some aspects described herein relate to an apparatus for wireless communication. The apparatus may include means for establishing a first non-cellular connection with a first access point. The apparatus may include means for transmitting. to a first gateway entity via the first access point, a connection setup request for a first cellular connection between the apparatus and a first network entity. The apparatus may include means for receiving a connection setup message from the first gateway entity via the first access point. The apparatus may include means for transmitting a connection complete message to the first gateway entity via the first access point.

Some aspects described herein relate to an apparatus for wireless communication. The apparatus may include means for receiving, from a first gateway entity, a connection setup request for a first cellular connection between a UE and the apparatus. The apparatus may include means for transmitting a connection setup message to the UE via the first gateway entity and a first access point. The apparatus may include means for receiving a connection complete message from the UE via the first gateway entity and the first access point.

Some aspects described herein relate to an apparatus for wireless communication. The apparatus may include means for forwarding, from a UE to a first network entity, a connection setup request for a first cellular connection between the UE and the first network entity. The apparatus may include means for forwarding a connection setup message from the first network entity to the UE via an access point. The apparatus may include means for forwarding a connection complete message from the UE to the first network entity.

Some aspects described herein relate to an apparatus for wireless communication. The apparatus may include means for receiving a UE context setup request for a first cellular connection between a UE and the apparatus. The apparatus may include means for transmitting a UE context response to a first network entity. The apparatus may include means for receiving a random access channel message from the UE via a first access point and a first gateway entity. The apparatus may include means for transmitting a random access response to the UE via the first gateway entity and the first access point. The apparatus may include means for receiving a reconfiguration complete message from the UE via the first access point and the first gateway entity, the reconfiguration complete message being associated with a second cellular connection to the apparatus. The apparatus may include means for transmitting a transfer message to the first network entity based at least in part on the reconfiguration complete message.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
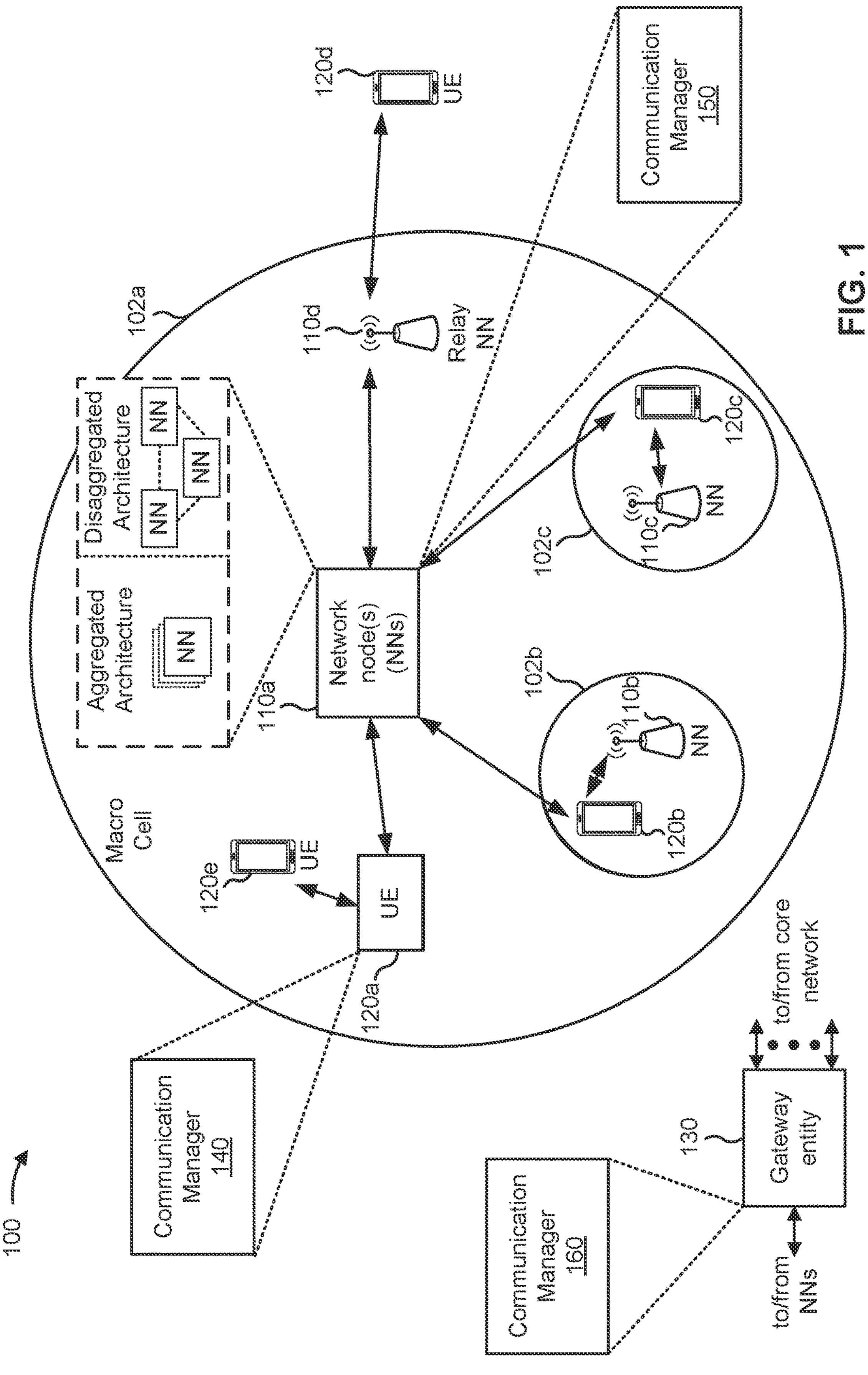
FIG. 1 is a diagram illustrating an example of a wireless network, in accordance with the present disclosure.

Various aspects relate generally to wireless communication and more particularly to a cellular connection over non-cellular access. Some aspects more specifically relate to a user equipment (UE) connecting to a 5G core network (5GC) via an untrusted non-cellular (non-3rd Generation Partnership Project (3GPP)) access. The non-3GPP access may be to an access point (AP) of a wide local area network (WLAN). The use of a WLAN may be useful for offloading traffic for cellular (e.g., 3GPP) radio and for complementing coverage with unified management. A UE may be connected to the 5GC via a non-3GPP interwork function (N3IWF), which may be a gateway function (in a gateway entity) between the UE and the 5GC for non-3GPP access. Internet protocol (IP) security (IPsec) may be used to protect data transfers over non-3GPP access between the UE and the N3IWF on an NWu interface.

In the existing access to 5GC via non-3GPP access, the UE is expected to support an additional security mechanism, such as IPsec, and procedures to protect data over untrusted non-3GPP access. However, data continuity and data security become an issue when the UE moves from one coverage to another (UE mobility), such as when the UE moves between non-3GPP access and 3GPP access.

According to various aspects described herein, the UE may secure data transmissions over non-3GPP access by connecting to the 5GC over the non-3GPP access via a gateway function (GWF) and by the GWF establishing security for data transmissions between the UE and a network entity, such as a gNB central unit.

Particular aspects of the subject matter described in this disclosure can be implemented to realize one or more of the following potential advantages. In some examples, by utilizing the GWF for security, the UE may utilize an existing access stratum (AS) layer framework and avoid the need for an additional security mechanism. Improved security may protect data while conserving processing and signaling resources by not implementing additional security elements at the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the 3GPP, the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller may couple to or communicate with a set of network nodes 110 and may provide coordination and control for these network nodes 110. The network controller may communicate with the network nodes 110 via a backhaul communication link or a midhaul communication link. The network nodes 110 may communicate with one another directly or indirectly via a wireless or wireline backhaul communication link. In some aspects, the network controller may be a CU or a core network device, or may include a CU or a core network device.

A gateway entity 130 may couple to or communicate with one or more network nodes 110 and elements of a core network. The gateway entity 130 may include a gateway function in a network entity of a core network.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may establish a first non-cellular connection with a first AP. The communication manager 140 may transmit, to a first gateway entity via the first AP, a connection setup request for a first cellular connection between the UE and a first network entity. The communication manager 140 may receive a connection setup message from the first gateway entity via the first AP. The communication manager 140 may transmit a connection complete message to the first gateway entity via the first AP. Additionally, or alternatively, the communication manager 140 may perform one or more other operations described herein.

In some aspects, a first network entity (e.g., a network node 110) may include a communication manager 150. As described in more detail elsewhere herein, the communication manager 150 may receive, from a first gateway entity, a connection setup request for a first cellular connection between a UE and the first network entity. The communication manager 150 may transmit a connection setup message to the UE via the first gateway entity and a first AP. The communication manager 150 may receive a connection complete message from the UE via the first gateway entity and the first AP. Additionally, or alternatively, the communication manager 150 may perform one or more other operations described herein.

In some aspects, a first gateway entity (e.g., a network node 110) may include a communication manager 160. As described in more detail elsewhere herein, the communication manager 160 may forward, from a UE to a first network entity, a connection setup request for a first cellular connection between the UE and the first network entity. The communication manager 160 may forward a connection setup message from the first network entity to the UE via an AP. The communication manager 160 may forward a connection complete message from the UE to the first network entity. Additionally, or alternatively, the communication manager 160 may perform one or more other operations described herein.

In some aspects, a second network entity (e.g., a network node 110) may include a communication manager 150. As described in more detail elsewhere herein, the communication manager 150 may receive a UE context setup request for a first cellular connection between a UE and the second network entity. The communication manager 150 may transmit a UE context response to a first network entity. The communication manager 150 may receive a random access channel message from the UE via a first AP and a first gateway entity. The communication manager 150 may transmit a random access response to the UE via the first gateway entity and the first AP. The communication manager 150 may receive a reconfiguration complete message from the UE via the first AP and the first gateway entity, the reconfiguration complete message being associated with a second cellular connection to the second network entity. The communication manager 150 may transmit a transfer message to the first network entity based at least in part on the reconfiguration complete message. Additionally, or alternatively, the communication manager 150 may perform one or more other operations described herein.

As indicated above, FIG. 1 is provided as an example. Other examples may differ from what is described with regard to FIG. 1.

Figure 2:
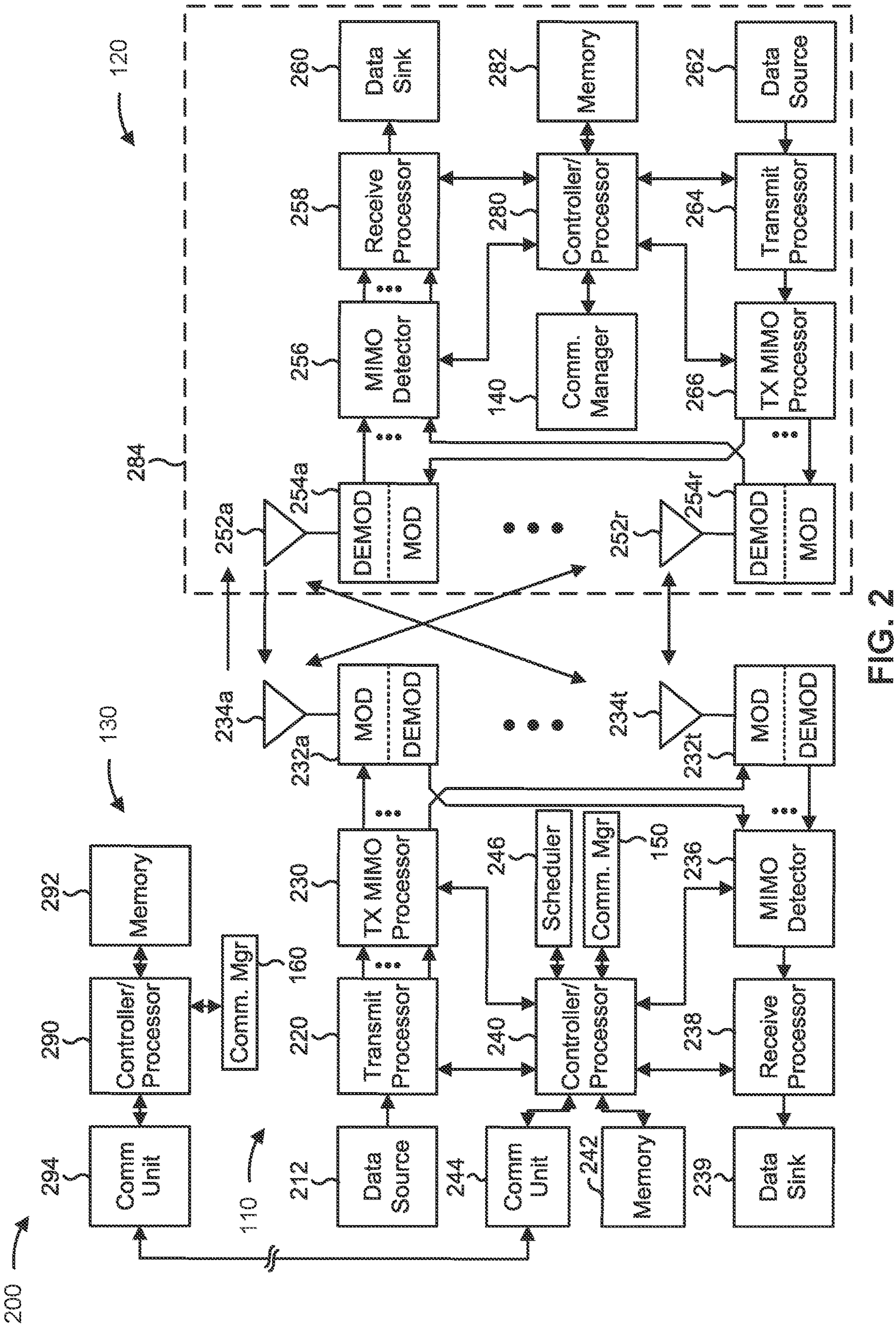
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The gateway entity 130 may include a communication unit 294, a controller/processor 290, and a memory 292. The gateway entity 130 may include, for example, one or more devices in a core network. The gateway entity 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-24).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-24).

A controller/processor of a network entity (e.g., a controller/processor 240 of the network node 110), the controller/processor 280 of the UE 120, the controller/processor 290 of a gateway entity, and/or any other component(s) of FIG. 2 may perform one or more techniques associated with establishing a cellular connection over an AP via a gateway, as described in more detail elsewhere herein. For example, the controller/processor 240 of the network node 110, the controller/processor 280 of the UE 120, the controller/processor 290 of a gateway entity, and/or any other component(s) of FIG. 2 may perform or direct operations of, for example, process 1800 of FIG. 18, process 1900 of FIG. 19, process 2000 of FIG. 20, process 2100 of FIG. 21, and/or other processes as described herein. The memory 242, the memory 282, and the memory 292 may store data and program codes for the network node 110, the UE 120, and the gateway entity 130, respectively. In some examples, the memory 242, the memory 282, and the memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110, the UE 120, and/or the gateway entity, may cause the one or more processors, the UE 120, the network node 110, and/or the gateway entity 130 to perform or direct operations of, for example, process 1800 of FIG. 18, process 1900 of FIG. 19, process 2000 of FIG. 20, process 2100 of FIG. 21, and/or other processes as described herein. In some examples, executing instructions may include running the instructions, converting the instructions, compiling the instructions, and/or interpreting the instructions, among other examples.

In some aspects, a UE (e.g., a UE 120) includes means for establishing a first non-cellular connection with a first AP; means for transmitting, to a first gateway entity via the first AP, a connection setup request for a first cellular connection between the UE and a first network entity; means for receiving a connection setup message from the first gateway entity via the first AP; and/or means for transmitting a connection complete message to the first gateway entity via the first AP. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first network entity (e.g., a network node 110) includes means for receiving, from a first gateway entity, a connection setup request for a first cellular connection between a UE and the first network entity; means for transmitting a connection setup message to the UE via the first gateway entity and a first AP; and/or means for receiving a connection complete message from the UE via the first gateway entity and the first AP. In some aspects, the means for the first network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a first gateway entity (e.g., a gateway entity 130) includes means for forwarding, from a UE to a first network entity, a connection setup request for a first cellular connection between the UE and the first network entity; means for forwarding a connection setup message from the first network entity to the UE via an AP; and/or means for forwarding a connection complete message from the UE to the first network entity. In some aspects, the means for the first gateway entity to perform operations described herein may include, for example, one or more of communication manager 160, a communication unit 294, a controller/processor 290, and a memory 292.

In some aspects, a second network entity (e.g., a network node 110) includes means for receiving a UE context setup request for a first cellular connection between a UE and the second network entity; means for transmitting a UE context response to a first network entity; means for receiving a random access channel message from the UE via a first AP and a first gateway entity; means for transmitting a random access response to the UE via the first gateway entity and the first AP; means for receiving a reconfiguration complete message from the UE via the first AP and the first gateway entity, the reconfiguration complete message being associated with a second cellular connection to the second network entity; and/or means for transmitting a transfer message to the first network entity based at least in part on the reconfiguration complete message. In some aspects, the means for the second network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an AP, a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
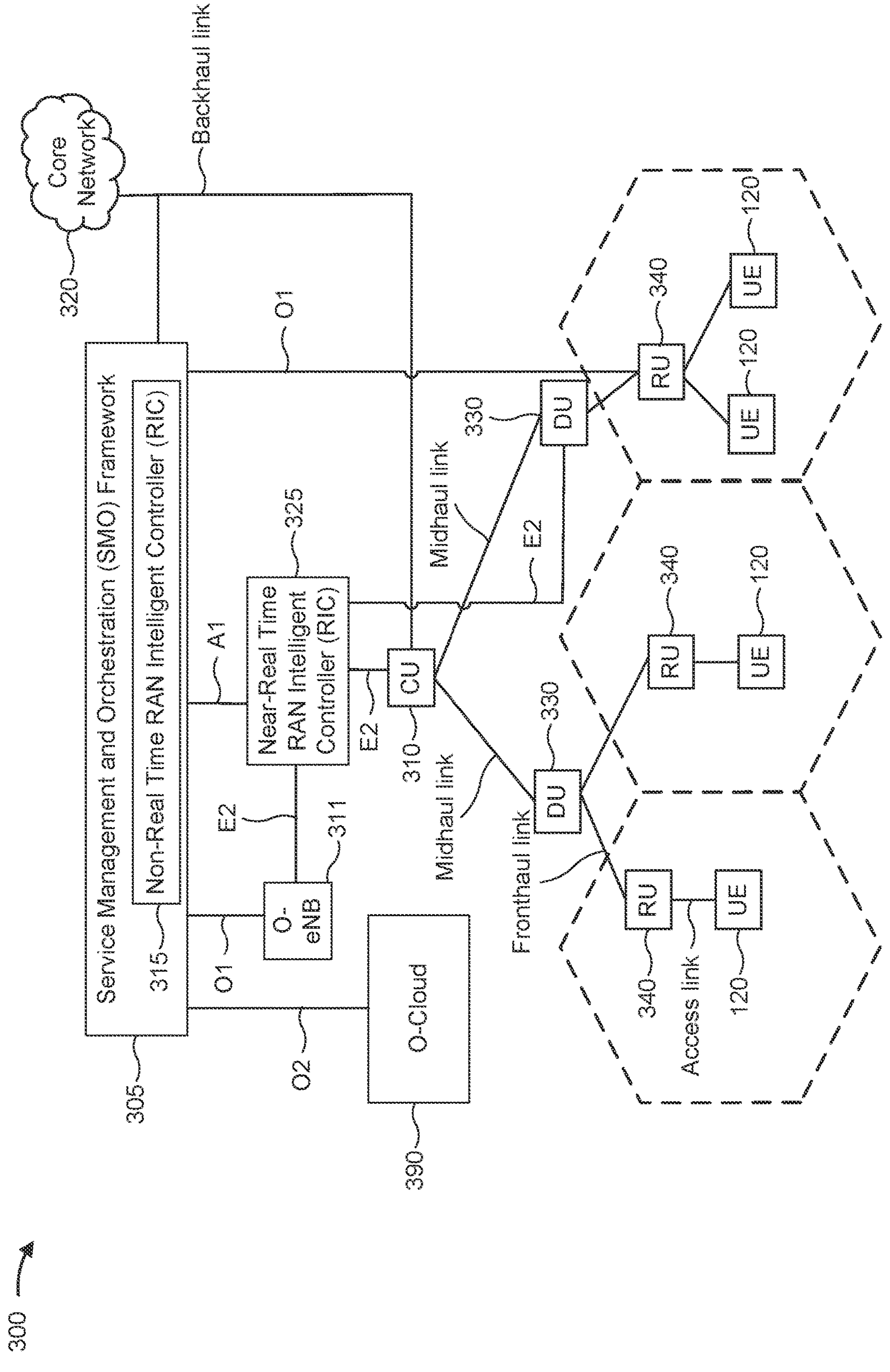
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
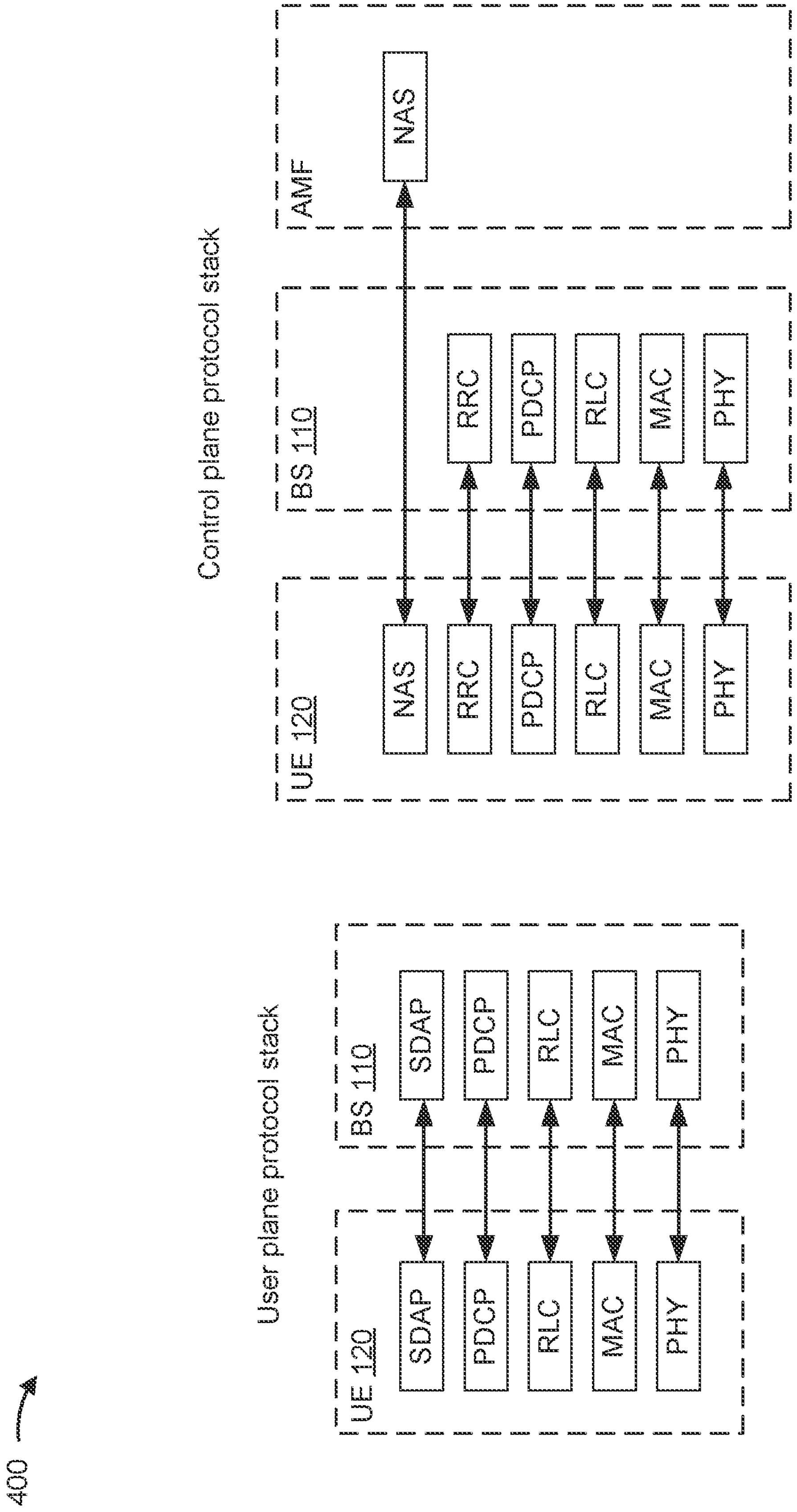
FIG. 4 is a diagram illustrating an example of a user plane protocol stack and a control plane protocol stack for a network node and a core network in communication with a UE, in accordance with the present disclosure.

FIG. 4 is a diagram illustrating an example 400 of a user plane protocol stack and a control plane protocol stack for a network node 110 and a core network in communication with a UE 120, in accordance with the present disclosure. In some aspects, the network node 110 may include a plurality of network nodes 110. In some aspects, protocol stack functions of the network node 110 may be distributed across multiple network nodes 110. For example, a first network node 110 may implement a first layer of a protocol stack and a second network node 110 may implement a second layer of the protocol stack. The distribution of the protocol stack across network nodes (in examples where the protocol stack is distributed across network nodes) may be based at least in part on a functional split, as described elsewhere herein. It should be understood that references to "a network node 110" or "the network node 110" can, in some aspects, refer to multiple network nodes.

On the user plane, the UE 120 and the network node 110 may include respective PHY layers, MAC layers, RLC layers, PDCP layers, and SDAP layers. A user plane function may handle transport of user data between the UE 120 and the network node 110. On the control plane, the UE 120 and the network node 110 may include respective RRC layers. Furthermore, the UE 120 may include a non-access stratum (NAS) layer in communication with an NAS layer of an access and management mobility function (AMF). The AMF may be associated with a core network associated with the network node 110, such as a 5GC or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 4, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QOS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the network node 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the network node 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 4 is provided as an example. Other examples may differ from what is described with regard to FIG. 4.

Figure 5:
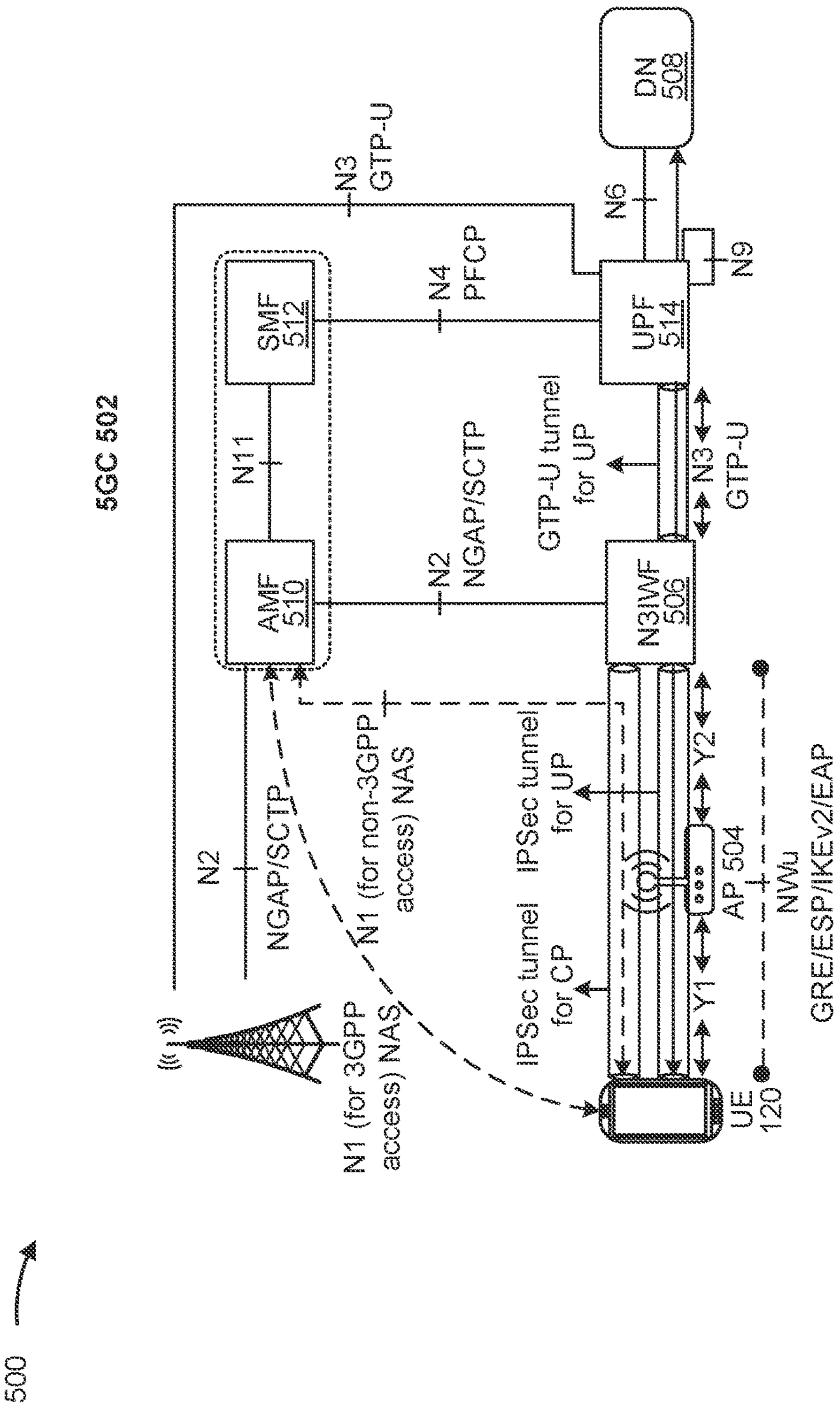
FIG. 5 is a diagram illustrating an example of 5G core network access with a non-cellular access, in accordance with the present disclosure.

FIG. 5 is a diagram illustrating an example 500 of 5G core network access with a non-cellular access, in accordance with the present disclosure.

A UE 120 may connect to a 5GC 502 via an untrusted non-cellular (non-3GPP) access, such as over an AP 504 of a WLAN or Wi-Fi network. The use of a WLAN may be useful for offloading traffic for a cellular (3GPP) radio and for complementing coverage with unified management. Other examples of non-cellular or non-3GPP access may include a fixed network, Bluetooth® technology, Zigbee® technology, a low energy network, a mesh network, a Wi-max network, a code-division multiple access (CDMA) network, or a Connectivity Standards Alliance network.

A UE may be connected to the 5GC 502 via an N3IWF 506, which may be a gateway function (in a gateway entity) between the UE 120 and the 5GC 502 for non-3GPP access. IPsec may be used to protect data transfers over non-3GPP access between the UE and the N3IWF on an NWu interface. The NWu interface may involve, for example, a generic routing encapsulation (GRE), an encapsulating security protocol (ESP), an internet key exchange (IKE) version 2, and an extensive authentication protocol (EAP).

The 5GC 502 may include a number of functional elements. The functional elements may include, for example, a network slice selection function (NSSF), a network exposure function (NEF), an authentication server function (AUSF), a unified data management (UDM) component, a policy control function (PCF), an application function (AF), an access and mobility management function (AMF), a session management function (SMF), and/or a user plane function (UPF), among other examples. These functional elements may be communicatively connected via a message bus. Some of these elements are shown in FIG. 5. The 5GC 502 may be connected to a data network (DN) 508.

The NSSF may include one or more devices that select network slice instances for the UE 120. Network slicing is a network architecture model in which logically distinct network slices operate using common network infrastructure. The NSSF may determine a set of network slice policies to be applied at the wireless communication network. For example, the NSSF may apply one or more UE route selection policy (URSP) rules. In some aspects, the NSSF may select a network slice based on a mapping of a data network name (DNN) field included in a route selection description (RSD) to the DNN field included in a traffic descriptor selected by the UE 120. By providing network slicing, the NSSF allows an operator to deploy multiple substantially independent end-to-end networks potentially with the same infrastructure. In some implementations, each slice may be customized for different services.

The NEF may include one or more devices that support exposure of capabilities and/or events in the wireless telecommunications system to help other entities in the wireless telecommunications system discover network services. The AUSF may include one or more devices that act as an authentication server and support the process of authenticating the UE 120 in the wireless telecommunications system.

The UDM may include one or more devices that store user data and profiles in the wireless telecommunications system. In some aspects, the UDM may be used for fixed access and/or mobile access, among other examples, in the core network.

The PCF may include one or more devices that provide a policy framework that incorporates network slicing, roaming, packet processing, and/or mobility management, among other examples. In some aspects, the PCF may include one or more URSP rules used by the NSSF to select network slice instances for the UE 120.

The AF may include one or more devices that support application influence on traffic routing, access to the NEF, and/or policy control, among other examples. The AMF (shown as AMF 510 in example 500) may include one or more devices that act as a termination point for NAS signaling and/or mobility management, among other examples. In some aspects, the AMF 510 may request the NSSF to select network slice instances for the UE 120, e.g., at least partially in response to a request for data service from the UE 120.

The SMF (shown as SMF 512) may include one or more devices that support the establishment, modification, and release of communication sessions in the wireless telecommunications system. For example, the SMF 512 may configure traffic steering policies at the UPF (shown as UPF 514) and/or enforce user equipment IP address allocation and policies, among other examples. In some aspects, the SMF 512 may provision the network slice instances selected by the NSSF for the UE 120.

The UPF 514 may include one or more devices that serve as an anchor point for intraRAT and/or interRAT mobility. In some aspects, the UPF 514 may apply rules to packets, such as rules pertaining to packet routing, traffic reporting, and/or handling user plane QoS, among other examples.

The message bus may be a logical and/or physical communication structure for communication among the functional elements. Accordingly, the message bus may permit communication between two or more functional elements, whether logically (e.g., using one or more application programming interfaces (APIs), among other examples) and/or physically (e.g., using one or more wired and/or wireless connections). The elements in the 5GC 502 may communicate over various interfaces, such as an N2 interface, an N3 interface, an N4 interface, an N6 interface, an N9 interface, and an N11 interface. Some of these interfaces may involve a next generation application protocol (NGAP), a stream control transmission protocol (SCTP), a packet forwarding control protocol (PFCP), and a general packet radio system (GPRS) tunnelling protocol user plane (GTP-U).

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of example 500 may perform one or more functions described as being performed by another set of devices of example environment 500.

As indicated above, FIG. 5 is provided as an example. Other examples may differ from what is described with regard to FIG. 5.

Figure 6:
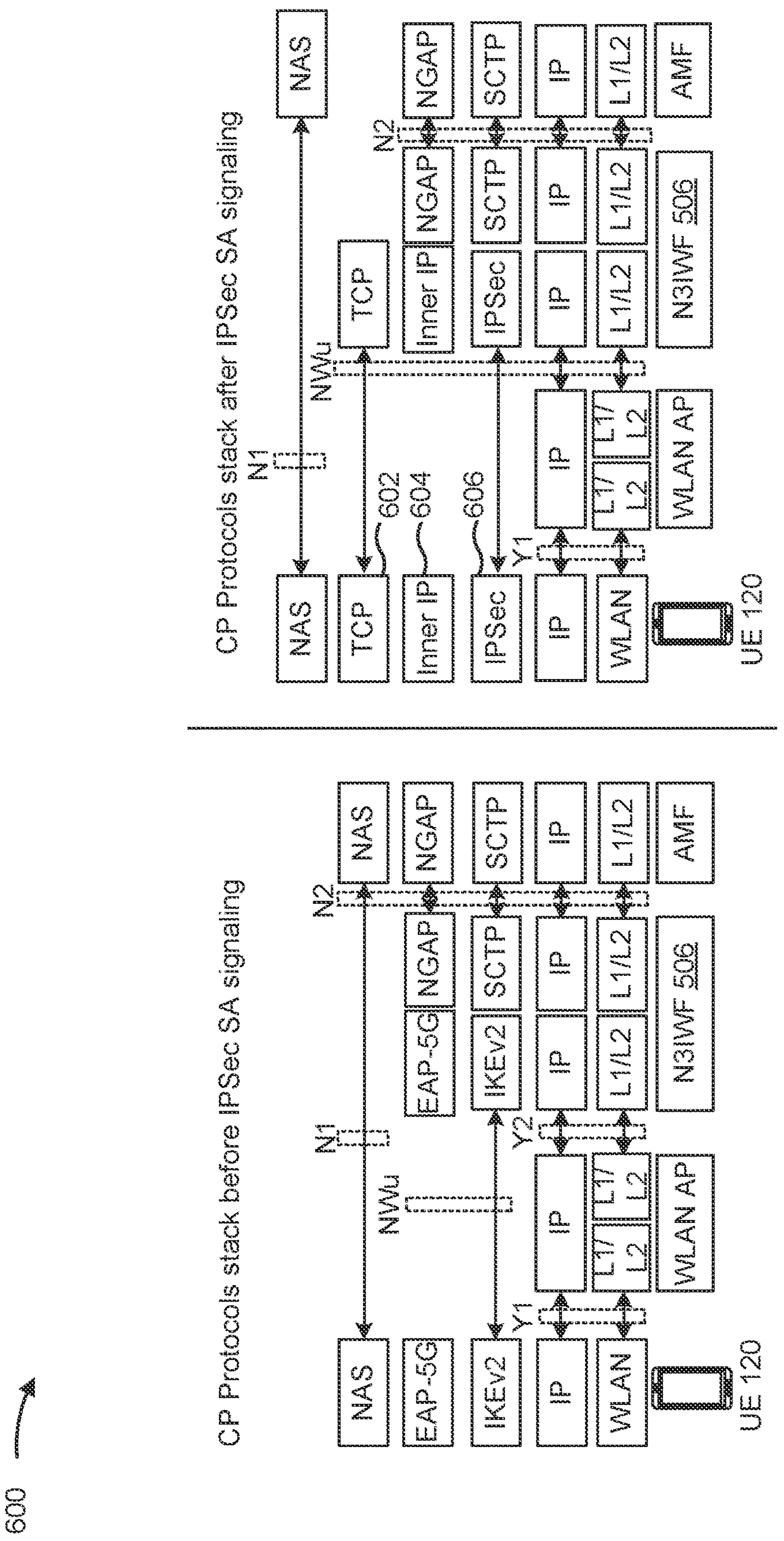
FIG. 6 is a diagram illustrating an example of protocol stacks, in accordance with the present disclosure.

FIG. 6 is a diagram illustrating an example 600 of protocol stacks, in accordance with the present disclosure.

Example 600 shows protocol stacks for a NWu connection. This may include a control protocol (CP) stack before IPsec security association (SA) signaling and a CP stack after IPsec SA signaling. This may include the establishment of a connection at a transmission control protocol (TCP) layer 602, an inner IP layer 604, and an IPsec layer 606 between the UE 120 and the N3IWF 506.

As indicated above, FIG. 6 is provided as an example. Other examples may differ from what is described with regard to FIG. 6.

Figure 7:
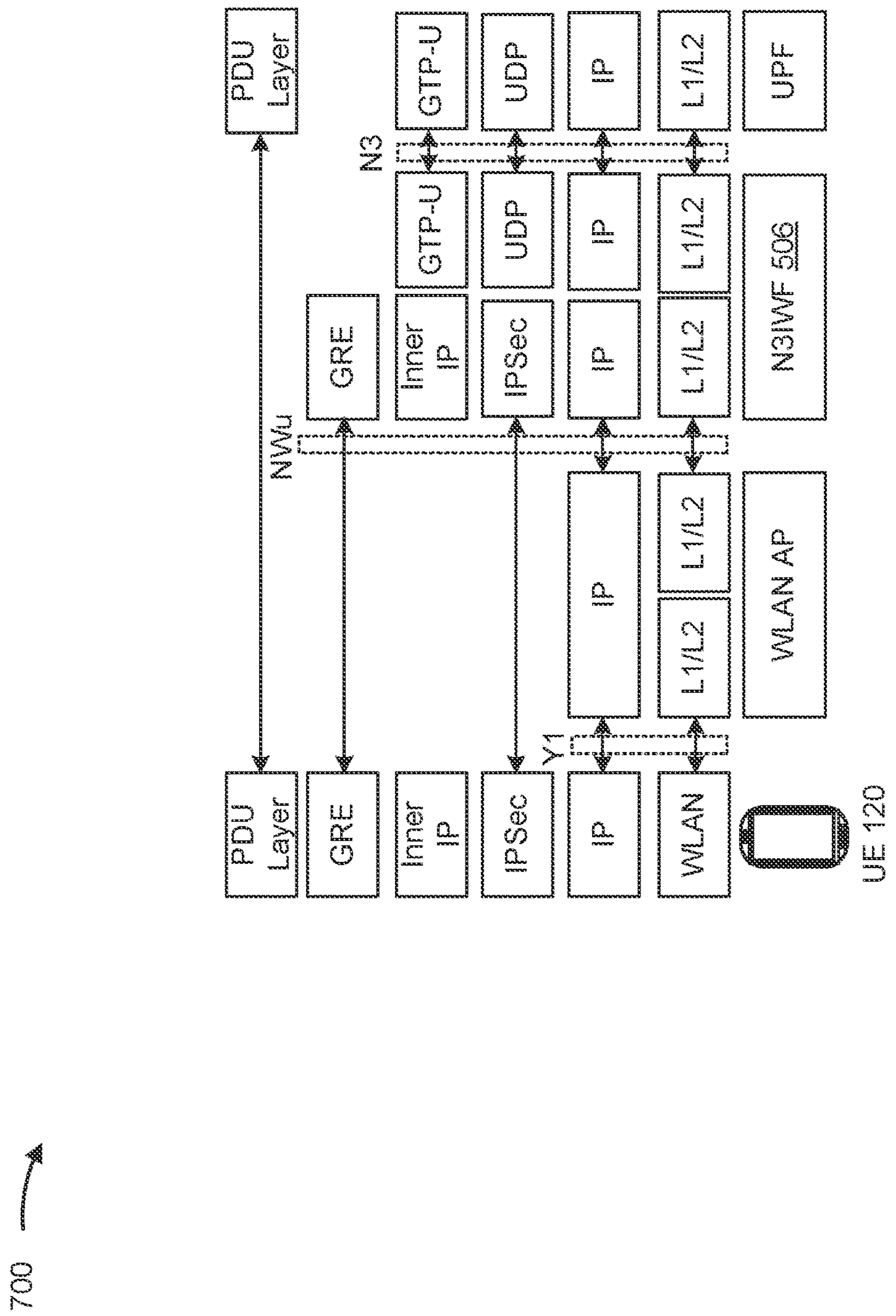
FIG. 7 is a diagram illustrating an example of a protocol stack, in accordance with the present disclosure.

FIG. 7 is a diagram illustrating an example of a protocol stack, in accordance with the present disclosure.

Example 700 shows protocols in the user plane (UP) between the UE 120 and the N3IWF 506. Such protocols may include a generic routing encapsulation (GRE) layer, an inner IP layer, an IPsec layer, an IP layer, and a Layer 1 (L1)/Layer 2 (L2) layer. The layers may be used for the transferring of PDU sessions.

As indicated above, FIG. 7 is provided as an example. Other examples may differ from what is described with regard to FIG. 7.

Figure 8:
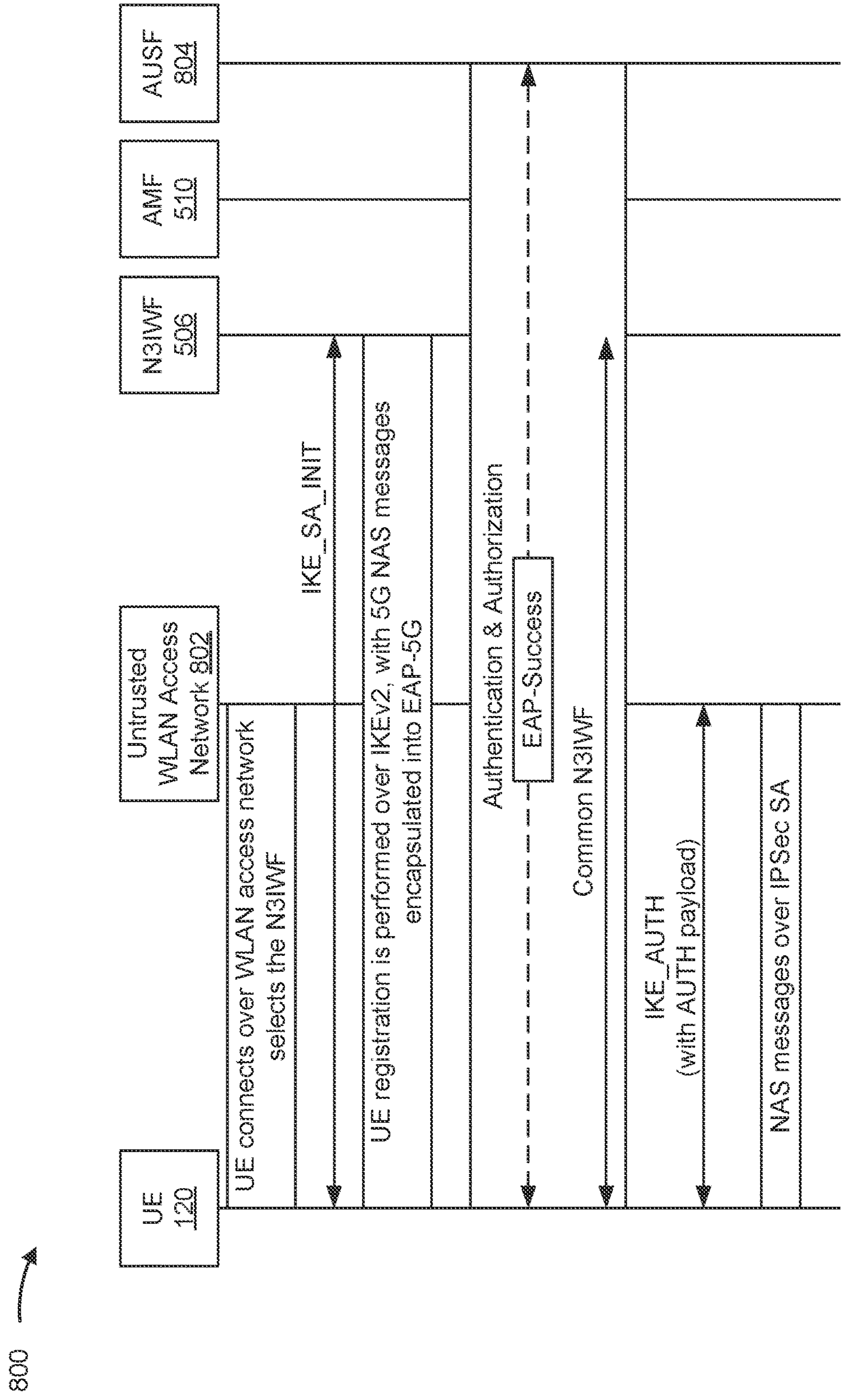
FIG. 8 is a diagram illustrating an example of internet protocol security signaling, in accordance with the present disclosure.

FIG. 8 is a diagram illustrating an example 800 of IPsec signaling, in accordance with the present disclosure.

In the existing access to 5GC via non-3GPP access, the UE 120 is expected to support an additional security mechanism, such as IPsec, and procedures to protect data over untrusted non-3GPP access. Example 800 shows signaling associated with IPsec. For example, the UE 120 may connect to an untrusted WLAN 802, which may select the N3IWF 506. An IKE initialization message (IKE_SA_INIT) may be exchanged between the UE 120 and the N3IWF 506. UE registration may be performed over IKE version 2 (IKEv2), with 5G NAS Messages encapsulated into EAP-5G. There may be authentication and authorization of the UE 120 with the AUSF 804. The UE 120 and the WLAN 802 may exchange an IKE authentication message and NAS messages over IPsec SA. However, data continuity and data security become an issue when the UE moves from one coverage to another (UE mobility), such as when the UE moves between non-3GPP access and 3GPP access.

As indicated above, FIG. 8 is provided as an example. Other examples may differ from what is described with regard to FIG. 8.

Figure 9:
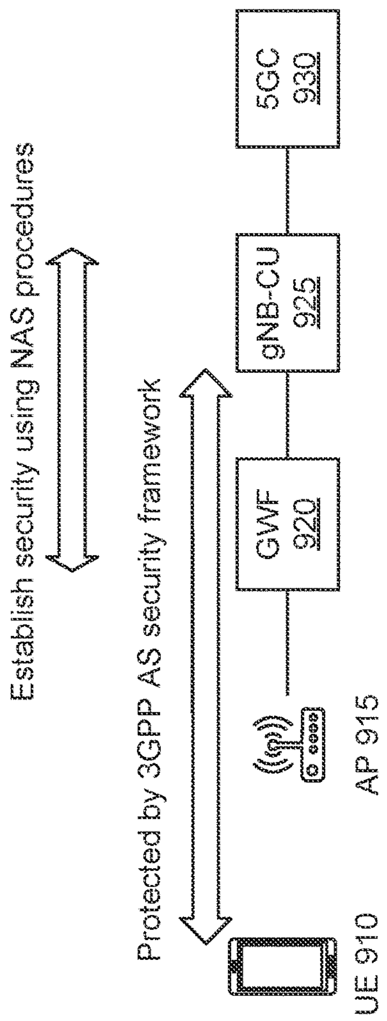
FIG. 9 is a diagram illustrating an example of using an access stratum layer, in accordance with the present disclosure.

FIG. 9 is a diagram illustrating an example 900 of using an access stratum (AS) layer, in accordance with the present disclosure. Example 900 shows a UE 910 that connects over an AP 915 (non-3GPP access) to a RAN network entity, such as a gNB-CU 925, via a GWF 920 (at a gateway entity). The gNB-CU 925 may connect to a 5GC 930.

According to various aspects described herein, the UE 910 may secure data transmissions over non-3GPP access by connecting to the 5GC 930 over the non-3GPP access via the GWF 920 and by the GWF 920 establishing security for data transmissions between the UE 910 and the gNB-CU 925. By utilizing the GWF 920 for security, the UE 910 may utilize an existing AS layer framework and avoid the need for an additional security mechanism. Improved security may protect data while conserving processing and signaling resources by not implementing additional security elements at the UE.

The UE 910 may connect to the gNB-CU 925 logically (e.g., at least at the RRC and PDCP layers) via the non-3GPP access. The UE 910 is not expected to be under coverage of the gNB-CU 925 physically. The UE 910 may transmit a connection setup request to the GWF 920 for a cellular connection between the UE 910 and the gNB-CU 925. The UE 910 may receive a connection setup message from the GWF 920 via the AP 915. The UE 910 may transmit a connection completed message to the GWF 920 via the AP 915. The GWF 920 may be used to route the data to/from the AP 915 and the gNB-CU 925. The GWF 920 may behave as a gNB-DU from the gNB-CU 925 perspective. The UE 910 may establish security with the gNB-CU 925 via one or more NAS operations. A NAS level operation may include an authentication operation that is performed between the UE 910 and the 5GC 930. At the network side, the 5GC 930 may provide security parameters to the gNB-CU 925. The gNB-CU 925 may use the security parameters to protect data over the non-3GPP access. This solution may be applied to any (untrusted) non-3GPP access, including wireline access.

As indicated above, FIG. 9 is provided as an example. Other examples may differ from what is described with regard to FIG. 9.

Figure 10:
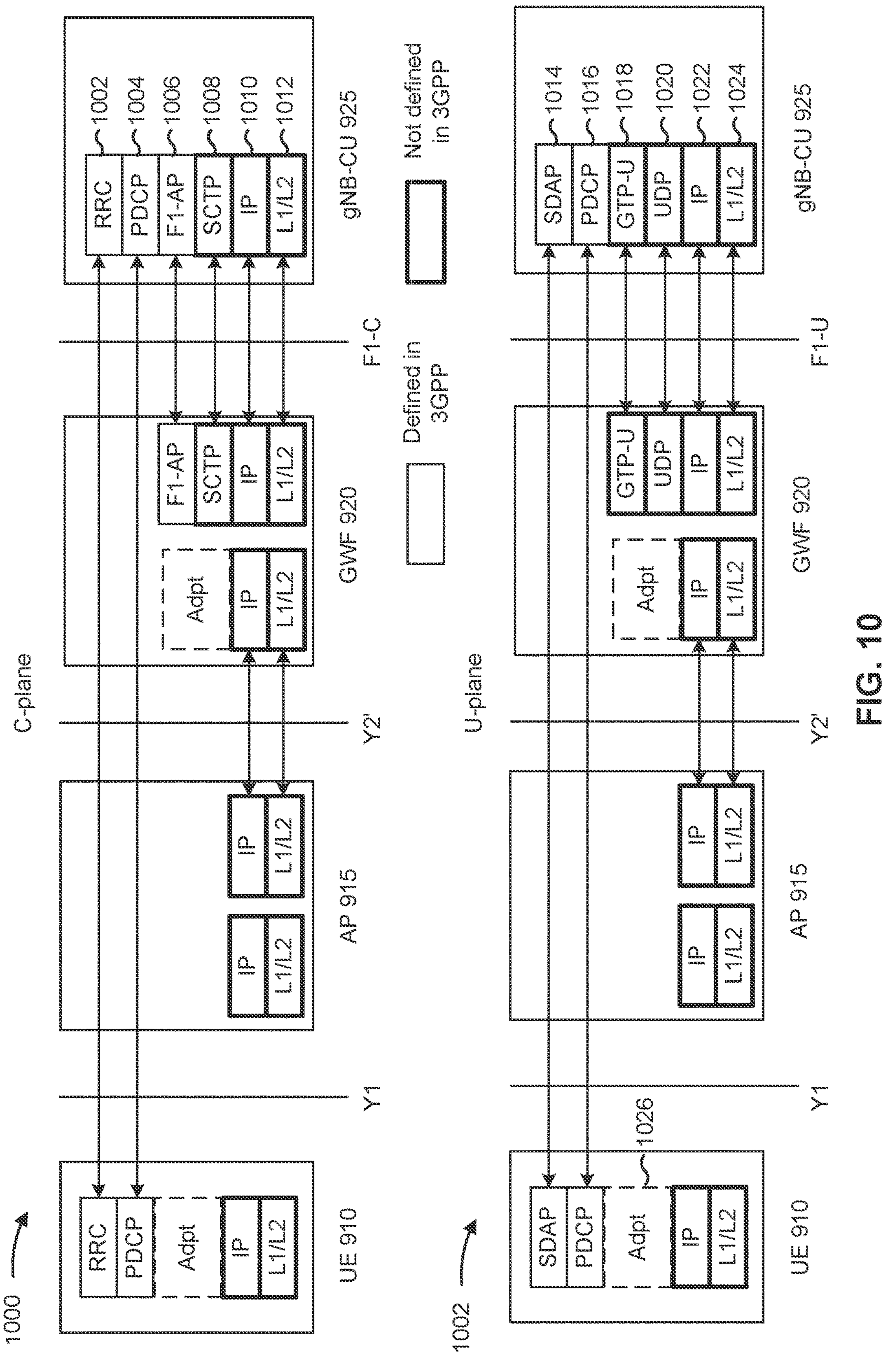
FIG. 10 is a diagram illustrating an example of protocol stacks, in accordance with the present disclosure.

FIG. 10 is a diagram illustrating an example 1000 of protocol stacks, in accordance with the present disclosure.

A cellular connection may be established at multiple protocol layers between the UE 910 and a RAN network entity, such as the gNB-CU 925. In some aspects, the cellular connection, for a CP, may be established at an RRC layer 1002 and a PDCP layer 1004 between the UE 910 and the gNB-CU 925 via the AP 915 and the GWF 920. The cellular connection may also be established, for the CP, at an F1 application protocol (F1-AP) layer 1006, an SCTP layer 1008, an IP layer 1010, and L1/L2 layer 1012 between the GWF 920 and the gNB-CU 925.

In some aspects, the cellular connection, for a UP, may be established at an SDAP layer 1014 and a PDCP layer 1016 between the UE 910 and the gNB-CU 925 via the AP 915 and the GWF 920. The cellular connection, for the UP, may be established at a GTP-U layer 1018, a user datagram protocol (UDP) layer 1020, and layer 1022, and an L1/L2 layer 1024 between the GWF 920 and the gNB-CU 925. Example 1000 also shows an adaption layer 1026.

As indicated above, FIG. 10 is provided as an example. Other examples may differ from what is described with regard to FIG. 10.

Figure 11:
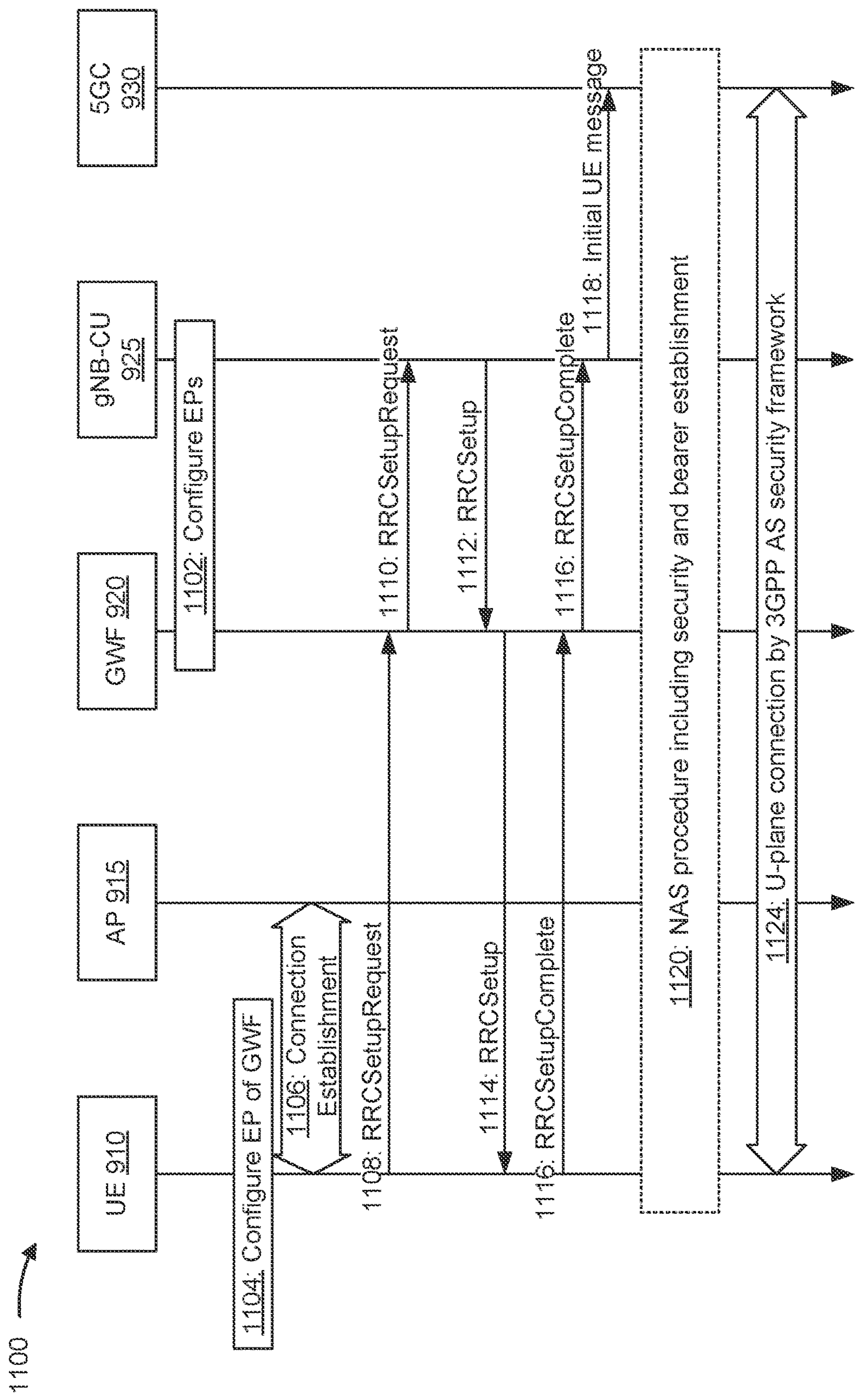
FIG. 11 is a diagram illustrating an example of setting up a cellular connection, in accordance with the present disclosure.

FIG. 11 is a diagram illustrating an example 1100 of setting up a cellular connection, in accordance with the present disclosure.

Example 1100 shows the setting up of a cellular connection (3GPP connection) between the UE 910 and the gNB-CU 925 over the AP 915 and via the GWF 920. The GWF 920 may support packet routing and a termination of an F1-C/U and an interface between the GWF 920 and the AP 915. Example 1100 also shows the establishment of security and a bearer. As shown by reference number 1102, the GWF 920 and the gNB-CU 925 may configure endpoints (EPs). The GWF 920 and the gNB-CU 925 may establish a network interface (e.g., F1). The gNB-CU 925 may be informed if the peer node is a GWF or a gNB-DU. A gNB-DU may use information from the GWF 920 to determine relevant behavior and timer values (e.g., longer timer values may be used for a GWF). As shown by reference number 1104, the UE 910 may be configured with an EP of the GWF 920. The endpoint information may include an identifier (ID) (e.g., IP address, UDP port, tunnel endpoint ID (TEID)). Destination IDs may be pre-configured in the UE 910 UE or a subscriber identity module (SIM) and may be selected by the UE 910 based at least in part on the information from the AP 915, a QoS, a UE location, and/or a time. Destination IDs may also be configured by the network.

As shown by reference number 1106, the UE 910 and the AP 915 may establish a connection (a non-cellular connection or a non-3GPP connection). When the access layer (non-3GPP layer) determines that a connection is established, the upper layer (e.g., RRC) may be informed. The access layer may determine that a connection is established when, for example, the IP address/UDP port is obtained, a specific packet is received from the AP 915, and/or a timer expires (starts when connection establishment is initiated). The AP 915 may provide network capability information (e.g., support of access to a 3GPP RAN via non-3GPP access) via broadcasting or dedicated signaling. The GWF 920 or a higher layer (e.g., application layer) may transmit the information periodically to the AP 915. An adaptation layer may transmit information (e.g., master information block (MIB), system information black (SIB)) for an upper layer (e.g., RRC layer) to initiate initial access, may be provided by adaptation layer, or the upper layer may skip the step to check such information (e.g., RRC layer may always consider that the RRC layer has valid information).

The UE 910 may seek to establish a cellular (e.g., 3GPP) connection. In the UE 910, the RRC layer may submit the RRC setup request (e.g., RRCSetupRequest) to lower layers. This message may be encapsulated with a source identifier (e.g., UE ID information), destination information (e.g., GWF ID/EP information), and/or a message type ID. The encapsulated packet may include information used by the GWF 920 to route the encapsulated packet to the suitable gNB-CU (e.g., QoS info, UE capability, RAT, 3GPP specification release). The information may be in the header. This encapsulation may be performed at the adaptation layer located above a non-3GPP access protocol. A message type ID may be used to identify bearers. As shown by reference number 1108, the UE 910 may transmit an RRC setup request via non-3GPP access (e.g., AP 915).

The GWF 920 may reassemble the request before forwarding. As shown by reference number 1110, the GWF 920 may forward the RRC setup request to the gNB-CU 925. The target GWF (GWF 920) may forward packets to the suitable gNB-CU based at least on part on the relevant information (described in connection with reference number 1108). The GWF 920 may also inform the gNB-CU 925 of following information: a cell ID (virtual cell identity), an allocated cell radio network temporary identifier (C-RNTI), whether the UE 910 is connected to non-3GPP access, and/or a dummy configuration to be included in an RRC setup message (e.g., L1 and MAC configuration).

As shown by reference number 1112, the gNB-CU 925 may transmit an RRC set up message to the GWF 920. As shown by reference number 1114, the GWF 920 may forward the RRC setup message to the UE 910. The message may be encapsulated with a source ID (e.g., GWF ID) and a destination ID (e.g., UE ID). The message may include an allocated C-RNTI.

In the UE 910, the RRC layer may submit an RRC setup complete message (e.g., RRCSetupComplete) to lower layers. As shown by reference number 1116, the UE 910 may transmit the RRC setup complete message to the GWF 920 via non-3GPP access. The message may be encapsulated with a source identifier (e.g., UE ID information) and destination information (e.g., GWF ID/EP information). As shown by reference number 1118, the gNB-CU 925 may transmit an initial UE message to the 5GC 930.

In some aspects, the UE 910 may establish security and a bearer for the cellular connection. As shown by reference number 1120, the UE 910 may use a NAS procedure. The UE 910 may rely on the connection between the GWF 920 and the gNB-CU 925 for security. As shown by reference number 1124, the UE 910 may have a UP cellular connection with a cellular (3GPP) AS security framework. As a result, the UE 910 may have security for data transmissions for the cellular connection that is not provided by IPsec alone.

As indicated above, FIG. 11 is provided as an example. Other examples may differ from what is described with regard to FIG. 11.

Figure 12:
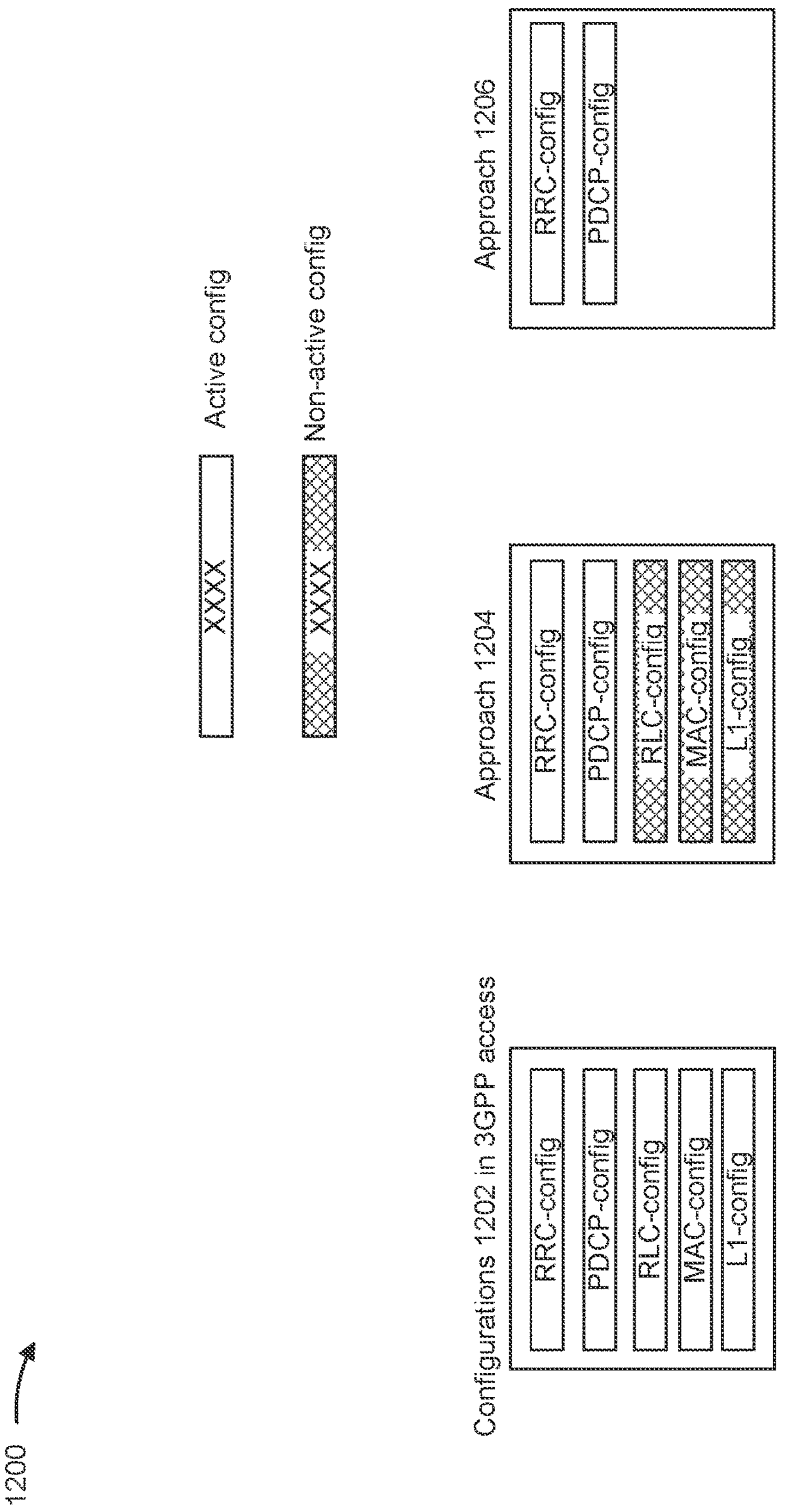
FIG. 12 is a diagram illustrating an example of UE configurations, in accordance with the present disclosure.

FIG. 12 is a diagram illustrating an example 1200 of UE configurations, in accordance with the present disclosure.

The UE 910 may be configured with L1, L2, and a Layer 3 (L3) configurations 1202 in 3GPP access. However, the UE 910 may not use L1/MAC/RLC mechanisms defined in 3GPP specifications, in the case of non-3GPP access. In some aspects, the UE 910 may deactivate or remove 3GPP configurations. In a first approach 1204, the UE 910 may be configured with 3GPP L1/MAC/RLC configurations but may not apply the configurations. Approach 1204 shows that some configurations may be inactive. This approach may seek to retain the current 3GPP access mechanism. The UE 910 may deactivate stored configurations. Configurations may be hard-coded (e.g., default/specified configuration), pre-configured in a UE/SIM, or provided by the network. The stored configuration may be used in a delta configuration in mobility.

In some aspects, shown by approach 1206, the UE may not be configured with 3GPP L1/MAC/RLC configurations. This approach may seek to avoid unnecessary configurations. The RRC layer and the PDCP layer may be aware of lower layers that are 3GPP access or non-3GPP access.

As indicated above, FIG. 12 is provided as an example. Other examples may differ from what is described with regard to FIG. 12.

Figure 13:
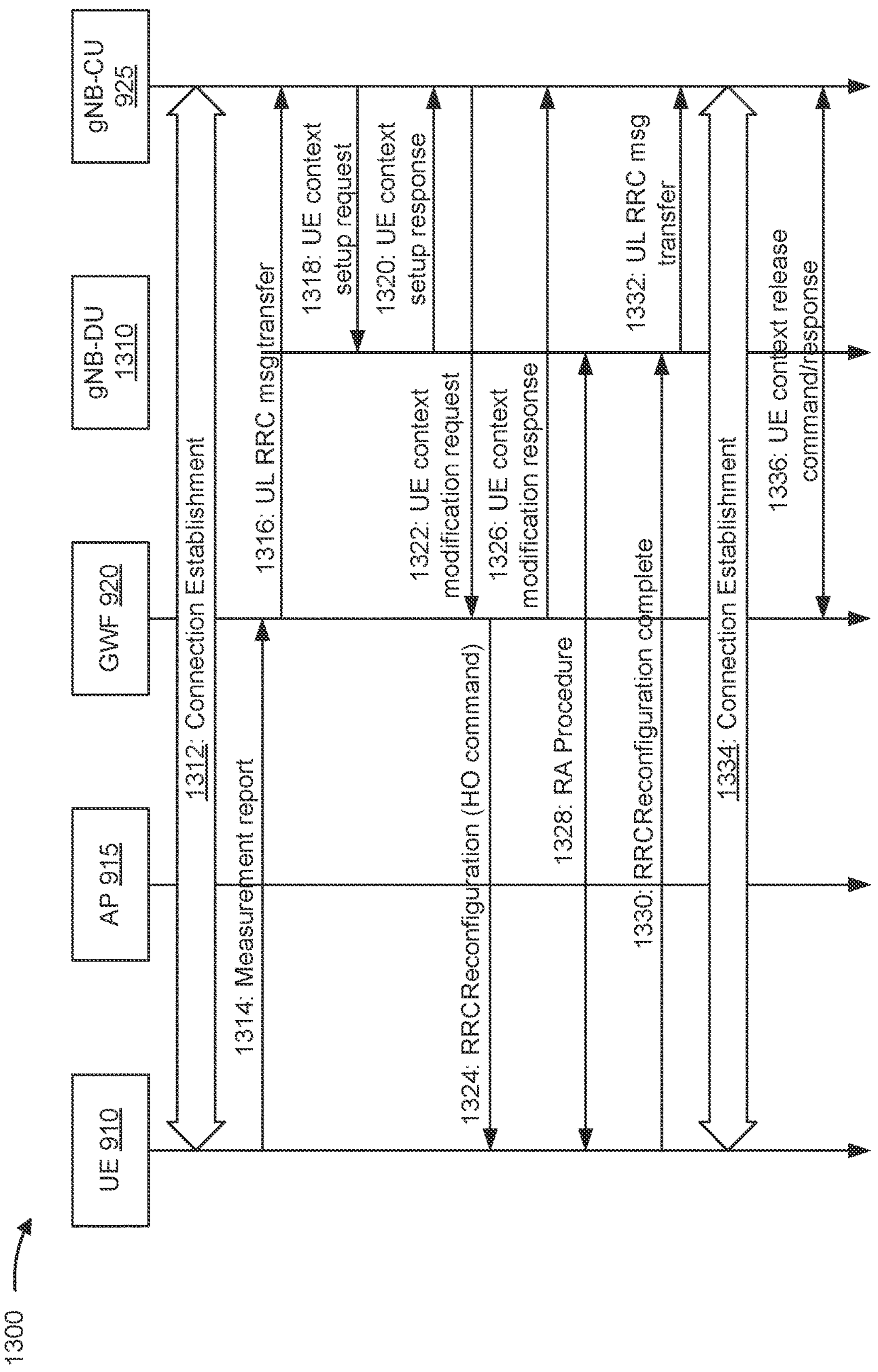
FIG. 13 is a diagram illustrating an example of UE mobility, in accordance with the present disclosure.

FIG. 13 is a diagram illustrating an example 1300 of UE mobility, in accordance with the present disclosure.

There are several UE mobility scenarios where security over non-3GPP access may be lost or missing, including a UE moving from non-3GPP access to 3GPP access (first scenario), from non-3GPP access to non-3GPP access (second scenario), or from 3GPP access to non-3GPP access (third scenario). Example 1300 shows a solution for establishing security when the UE 910 moves from non-3GPP access to 3GPP access (first scenario). As shown by reference number 1312, a cellular (e.g., 3GPP) connection may be established between the UE 910 and the gNB-CU 925 via the GWF 920. Example 1300 more specifically shows the UE 910 moving from the connection with the gNB-CU 925 to a connection with a gNB-DU 1310. The gNB-DU 1310 may be controlled by the gNB-CU 925, and this scenario may be part of intra-CU mobility.

As shown by reference number 1314, the UE 910 may transmit a measurement report (e.g., for the quality of a 3GPP cell) to the GWF 920. The GWF 920 may forward the measurement report to the gNB-CU 925. As shown by reference number 1316, the GWF 920 may transmit an uplink (UL) RRC message (with the measurement report) to the gNB-CU 925.

The gNB-CU 925 may seek to move the UE context from the gNB-CU 925 to the gNB-DU 1310, which may involve modifying the UE context at the GWF 920. As shown by reference number 1318, the gNB-CU 925 may transmit a UE context setup request to the gNB-DU 1310. As shown by reference number 1320. the gNB-DU 1310 may transmit a UE context setup response to the gNB-CU 925. As shown by reference number 1322, the gNB-CU 925 may transmit a UE context modification request to the GWF 920. As shown by reference number 1324, the GWF 920 may transmit an RRC reconfiguration message (e.g., handover (HO) command) to the UE 910. As shown by reference number 1326, the GWF 920 may transmit a UE context modification response to the gNB-CU 925.

As shown by reference number 1328, the UE 910 may perform a random access (RA) procedure with the gNB-DU 1310 to establish a 3GPP connection. as shown by reference number 1330, the UE 910 may transmit an RRC reconfiguration complete message. The gNB-DU 1310 may forward the message. As shown by reference number 1332, the gNB-DU 1310 may transmit an uplink RRC message to the gNB-CU 925. As shown by reference number 1334, the 3GPP connection may be established between the UE 910 and the gNB-DU 1310 via the GWF 920. As shown by reference number 1336, the GWF 920 and the gNB-CU 925 may release the UE context with a command and a response. Security may be established between the GWF 920 and the gNB-DU 1310 for data transfers. With the GWF 920 still involved with the 3GPP connection over non-3GPP access (AP 915), security may be maintained for data transfers involving the UE 910.

In some aspects, the UE 910 may not be configured with 3GPP L1/MAC/RLC configurations with non-3GPP access. When the UE 910 establishes the 3GPP connection, the gNB-CU 925 or the gNB-DU 1310 may add the configurations to the UE 910. In some aspects, the UE 910 may be configured with inactive 3GPP L1/MAC/RLC configurations with non-3GPP access. When the UE 910 establishes the 3GPP connection, the gNB-CU 925 or the gNB-DU 1310 may activate the stored configurations (e.g., apply the configurations).

As indicated above, FIG. 13 is provided as an example. Other examples may differ from what is described with regard to FIG. 13.

Figure 14:
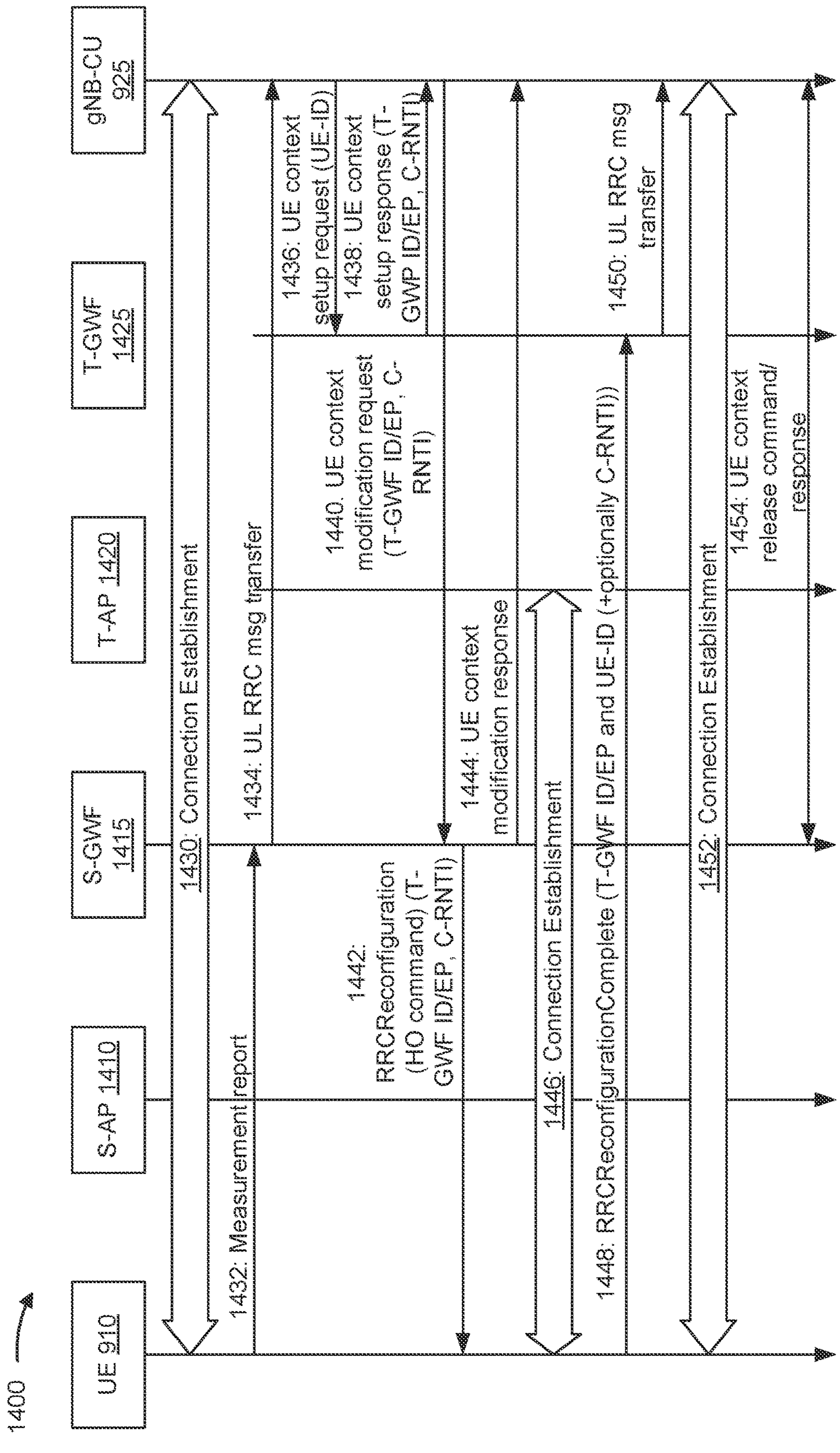
FIG. 14 is a diagram illustrating an example of UE mobility, in accordance with the present disclosure.

FIG. 14 is a diagram illustrating an example 1400 of UE mobility, in accordance with the present disclosure.

Example 1400 shows a solution for establishing security when the UE 910 moves from non-3GPP access to non-3GPP access (second scenario). This may include the UE 910 moving a 3GPP connection over a source AP (S-AP) 1410 and a source GWF (S-GWF 1415) to a target AP (T-AP) 1420 and a target GWF (T-GWF 1425). The S-AP 1410 and the T-AP 1420 may operate like the AP 915. The S-GWF 1415 and the T-GWF 1425 may operate like the GWF 920. As shown by reference number 1430, a cellular (e.g., 3GPP) connection may be established between the UE 910 and the gNB-CU 925 over the S-AP 1410 via the S-GWF 1415.

As shown by reference number 1432, the UE 910 may transmit a measurement report (e.g., for the quality of a 3GPP cell) to the S-GWF 1415. The S-GWF 1415 may forward the measurement report to the gNB-CU 925. As shown by reference number 1434, the GWF 920 may transmit an uplink RRC message (with the measurement report) to the gNB-CU 925.

The gNB-CU 925 may seek to move the UE context from the S-GWF 1415 to the T-GWF 1425. As shown by reference number 1436, the gNB-CU 925 may transmit a UE context setup request to the T-GWF 1425 with a UE ID (e.g., IP address). As shown by reference number 1438, the T-GWF 1425 may transmit a UE context setup response to the gNB-CU 925. The response may include a T-GWF ID or EP and a C-RNTI. As shown by reference number 1440, the gNB-CU 925 may transmit a UE context modification request to the S-GWF 1415 (with an HO command). As shown by reference number 1442, the S-GWF 1415 may transmit an RRC reconfiguration message (e.g., HO command) to the UE 910. As shown by reference number 1444, the S-GWF 1415 may transmit a UE context modification response to the gNB-CU 925.

As shown by reference number 1446, the UE 910 may establish a non-3GPP connection with the T-AP 1420. As shown by reference number 1448, the UE 910 may transmit an RRC reconfiguration complete message. The message may include a T-GWF ID or EP and a UE ID (and optionally a C-RNTI). The T-GWF 1425 may forward the message. As shown by reference number 1450, the T-GWF 1425 may transmit an uplink RRC message to the gNB-CU 925.

As shown by reference number 1452, the 3GPP connection may be established between the UE 910 and the gNB-CU 925 over the T-AP 1420 and the T-GWF 1425. As shown by reference number 1454, the S-GWF 1415 and the gNB-CU 925 may release the UE context with a command and a response. Security may be established between the T-GWF 1425 and the gNB-CU 925 for data transfers. With the S-GWF 1415 and the T-GWF 1425 involved with the 3GPP connections over non-3GPP access (S-AP 1410 and T-AP 1420), security may be maintained for data transfers involving the UE 910.

In some aspects, the UE 910 may be configured with 3GPP L1/MAC/RLC configurations with 3GPP access. When the UE 910 establishes a 3GPP connection with non-3GPP access, the gNB-CU 925 or the gNB-DU 1310 may remove (explicitly or implicitly) the configurations from the UE 910. In some aspects, the UE 910 may be configured with active 3GPP L1/MAC/RLC configurations with 3GPP access. When the UE 910 establishes the 3GPP connection with non-3GPP access, the gNB-CU 925 or the gNB-DU 1310 may deactivate the stored configurations (e.g., not apply or ignore).

As indicated above, FIG. 14 is provided as an example. Other examples may differ from what is described with regard to FIG. 14.

Figure 15:
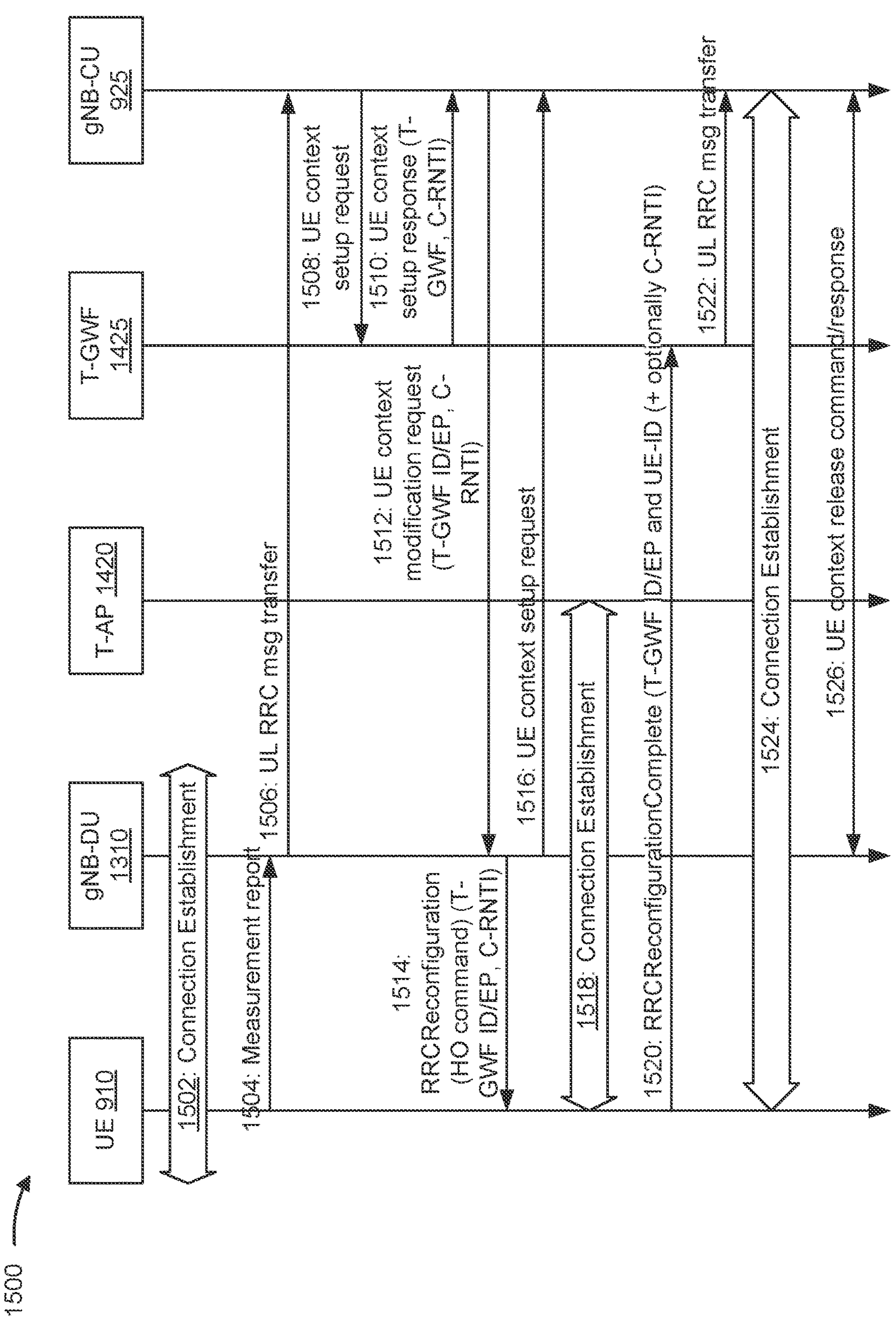
FIG. 15 is a diagram illustrating an example of UE mobility, in accordance with the present disclosure.

FIG. 15 is a diagram illustrating an example 1500 of UE mobility, in accordance with the present disclosure.

Example 1500 shows a solution for establishing security when the UE 910 moves from 3GPP access to non-3GPP access (third scenario). This may include the UE 910 moving a 3GPP connection from the gNB-DU 1310 to a 3GPP connection with the gNB-CU 925 over non-3GPP access (T-AP 1420) and via the T-GWF 1425. As shown by reference number 1502, a cellular (e.g., 3GPP) connection may be established between the UE 910 and the gNB-DU 1310.

As shown by reference number 1504, the UE 910 may transmit a measurement report (e.g., for the quality of a 3GPP cell) to the gNB-DU 1310. The gNB-DU 1310 may forward the measurement report to the gNB-CU 925. As shown by reference number 1506, the gNB-DU 1310 may transmit an uplink RRC message (with the measurement report) to the gNB-CU 925.

The gNB-CU 925 may seek to move the UE context from the gNB-DU 1310 to the T-GWF 1425. As shown by reference number 1508, the gNB-CU 925 may transmit a UE context setup request to the T-GWF 1425 with a UE ID (e.g., IP address). As shown by reference number 1510, the T-GWF 1425 may transmit a UE context setup response to the gNB-CU 925. The response may include a T-GWF ID or EP and a C-RNTI. As shown by reference number 1512, the gNB-CU 925 may transmit a UE context modification request to the gNB-DU 1310 (with an HO command). As shown by reference number 1514, the S-GWF 1415 may transmit an RRC reconfiguration message (e.g., HO command) to the UE 910. As shown by reference number 1516, the S-GWF 1415 may transmit a UE context modification response to the gNB-CU 925.

As shown by reference number 1518, the UE 910 may establish a non-3GPP connection with the T-AP 1420. As shown by reference number 1520, the UE 910 may transmit an RRC reconfiguration complete message. The message may include a T-GWF ID or EP and a UE ID (and optionally a C-RNTI). The T-GWF 1425 may forward the message. As shown by reference number 1522, the T-GWF 1425 may transmit an uplink RRC message to the gNB-CU 925.

As shown by reference number 1524, the 3GPP connection may be established between the UE 910 and the gNB-CU 925 with non-3GPP access over the T-AP 1420 and via the T-GWF 1425. As shown by reference number 1526, the S-GWF 1415 and the gNB-CU 925 may release the UE context with a command and a response. Security may be established between the T-GWF 1425 and the gNB-CU 925 for data transfers. With the T-GWF 1425 involved with the 3GPP connection over non-3GPP access (S-AP 1410 and T-AP 1420), security may be maintained for data transfers involving the UE 910.

In some aspects, the UE 910 may be configured with 3GPP L1/MAC/RLC configurations with 3GPP access. When the UE 910 establishes a 3GPP connection with non-3GPP access, the gNB-CU 925 or the gNB-DU 1310 may remove the configurations from the UE 910. In some aspects, the UE 910 may be configured with active 3GPP L1/MAC/RLC configurations with 3GPP access. When the UE 910 establishes the 3GPP connection with non-3GPP access, the gNB-CU 925 or the gNB-DU 1310 may deactivate the stored configurations.

As indicated above, FIG. 15 is provided as an example. Other examples may differ from what is described with regard to FIG. 15.

Figure 16:
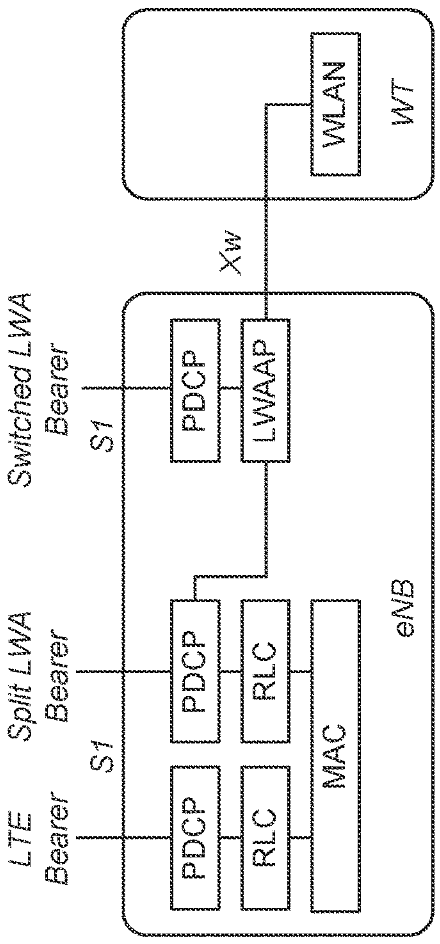
FIG. 16 is a diagram illustrating an example of protocol stacks for bearers, in accordance with the present disclosure.

FIG. 16 is a diagram illustrating an example 1600 of protocol stacks for bearers, in accordance with the present disclosure.

Example 1600 shows protocol stacks at a network entity (e.g., eNB) for an LTE bearer, a split LWA (LTE-WLAN aggregation) bearer, and a switched LWA bearer. In the case of multiple bearers, a UE and a network may identify to/from which bearer the data is going. For LWA bearers, the adaptation layer attaches a bearer ID in its header to indicate to which bearer the PDCP PDU belongs and which PDCP end marker will be used to resolve the ambiguity of a security key used during mobility. However, this mechanism may not be sufficiently robust for a control plane since a PDCP end marker may be dropped when non-3GPP access is involved. The dropped marker may cause the UE to lose track of bearer IDs and there may be ambiguity that causes security for the bearers to fail.

As indicated above, FIG. 16 is provided as an example. Other examples may differ from what is described with regard to FIG. 16.

Figure 17:
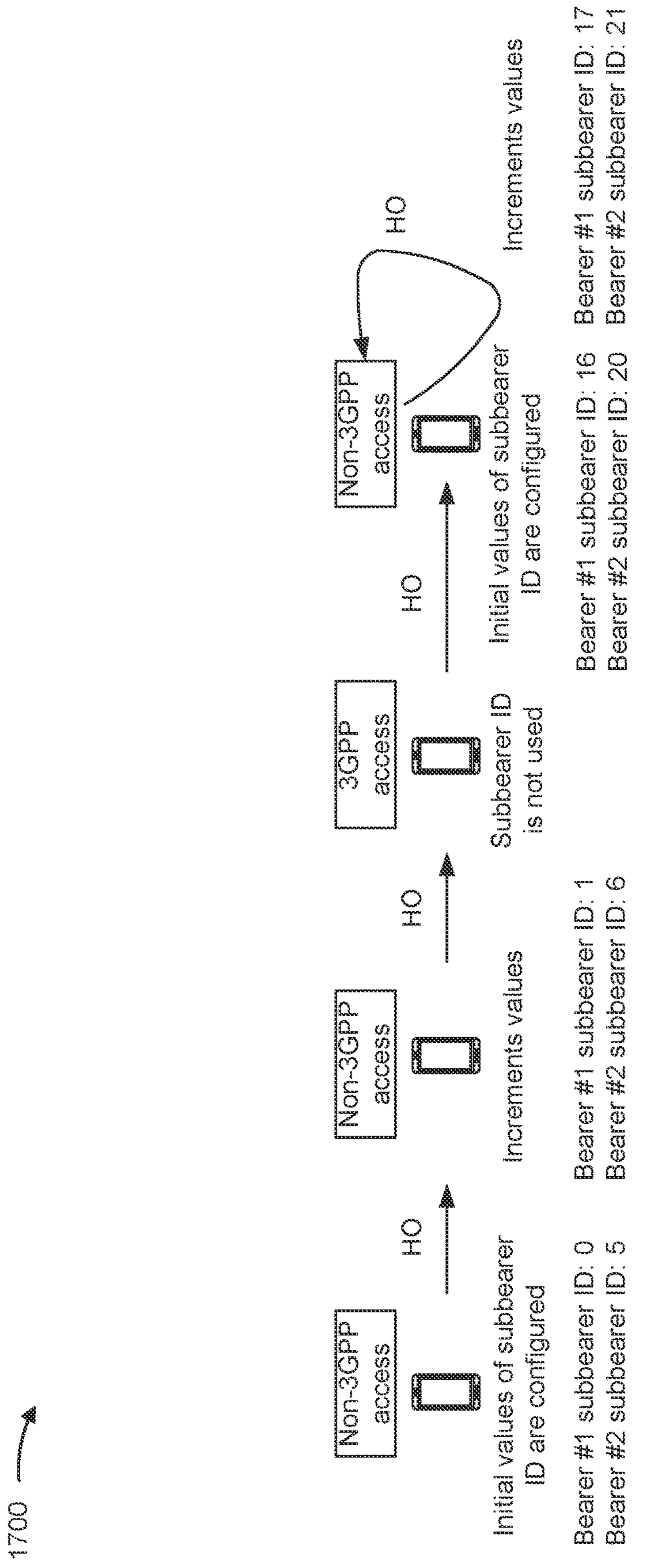
FIG. 17 is a diagram illustrating an example of bearer identification, in accordance with the present disclosure.

FIG. 17 is a diagram illustrating an example 1700 of bearer identification, in accordance with the present disclosure.

In some aspects, the UE may use a solution to keep track if bearers when non-3GPP access is involved. The adaptation layer at the UE may attach a new ID in the header (e.g., subbearer ID) for each PDCP PDU. When the UE moves to a non-cellular access (non-3GPP access) for the first time (or moves from 3GPP access), the UE may set the subbearer IDs to initial values (configured by the network) for each bearer. The initial value may be provided by the GWF. The ID will be incremented by a fixed step (e.g., incremented by one) when the UE moves to non-3GPP access (including a CU change without a non-3GPP access change). The network may indicate whether the UE needs to increment or not increment a subbearer ID per UE or per bearer. When no value is indicated by the network, UE may determine the value and inform the network of the value, or the UE may keep using the last values used in the last non-3GPP access.

Example 1700 shows initial values of 0 for subbearer 1 and 5 for subbearer 2. At a next non-3GPP access (e.g., after a HO), the UE may increment the values. If the UE moves to 3GPP access, no subbearer IDs are used. If the UE moves to non-3GPP access again, initial values are configured. For each subsequent non-3GPP access, the subbearer IDs may be incremented. In this way, the UE keeps track of bearers and security for the bearers does not fail.

As indicated above, FIG. 17 is provided as an example. Other examples may differ from what is described with regard to FIG. 17.

Figure 18:
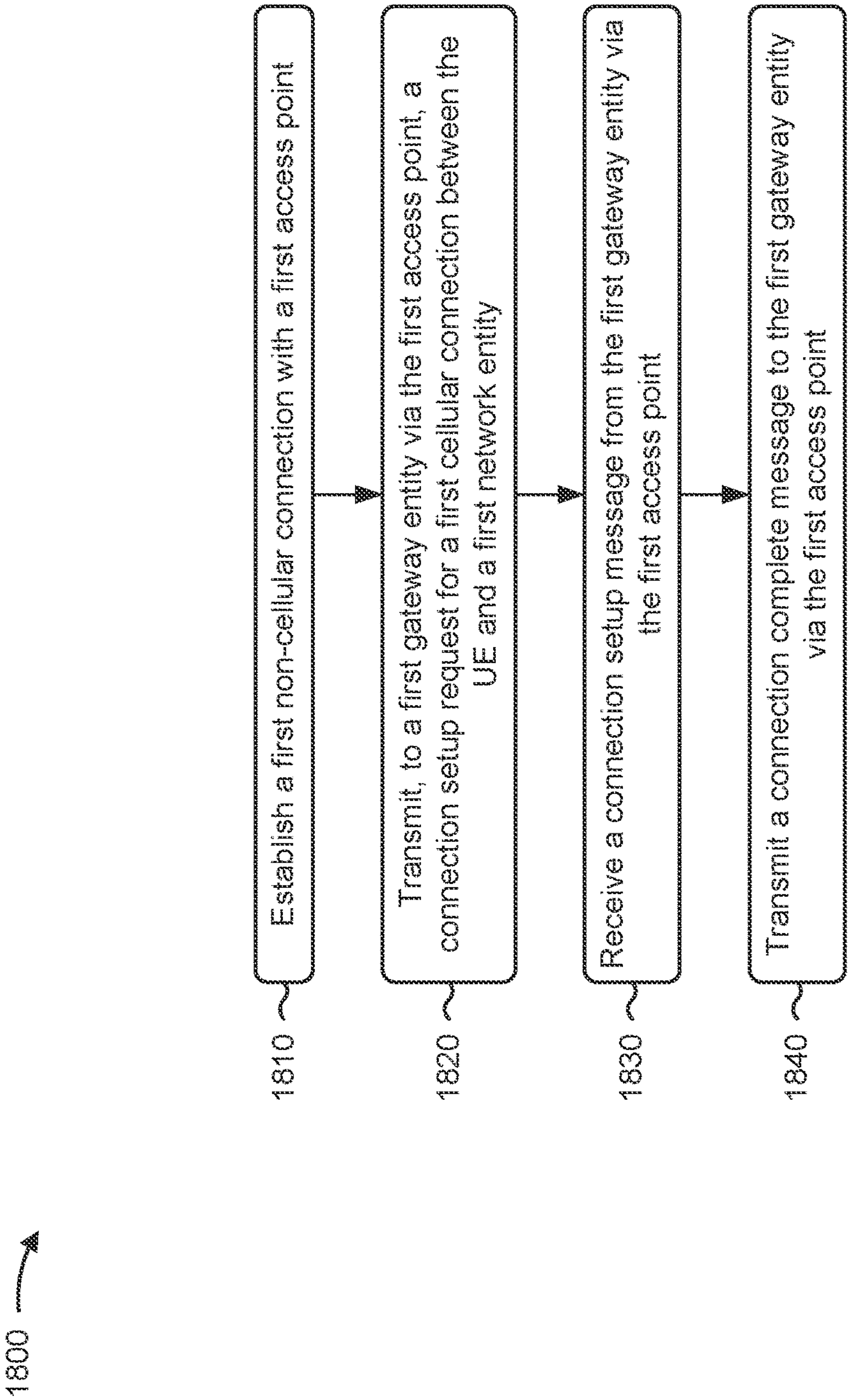
FIG. 18 is a diagram illustrating an example process performed, for example, at a UE or an apparatus of a UE, in accordance with the present disclosure.

FIG. 18 is a diagram illustrating an example process 1800 performed, for example, at a UE or an apparatus of a UE, in accordance with the present disclosure. Example process 1800 is an example where the apparatus or the UE (e.g., UE 120, UE 910) performs operations associated with establishing a cellular connection (e.g., 3GPP connection) over an AP via a gateway.

As shown in FIG. 18, in some aspects, process 1800 may include establishing a first non-cellular connection (e.g., non-3GPP connection) with a first AP (block 1810). For example, the UE (e.g., using communication manager 2206, depicted in FIG. 22) may establish a first non-cellular connection with a first AP, as described above.

As further shown in FIG. 18, in some aspects, process 1800 may include transmitting, to a first gateway entity via the first AP, a connection setup request for a first cellular connection between the UE and a first network entity (block 1820). For example, the UE (e.g., using transmission component 2204 and/or communication manager 2206, depicted in FIG. 22) may transmit, to a first gateway entity via the first AP, a connection setup request for a first cellular connection between the UE and a first network entity, as described above.

As further shown in FIG. 18, in some aspects, process 1800 may include receiving a connection setup message from the first gateway entity via the first AP (block 1830). For example, the UE (e.g., using reception component 2202 and/or communication manager 2206, depicted in FIG. 22) may receive a connection setup message from the first gateway entity via the first AP, as described above.

As further shown in FIG. 18, in some aspects, process 1800 may include transmitting a connection complete message to the first gateway entity via the first AP (block 1840). For example, the UE (e.g., using transmission component 2204 and/or communication manager 2206, depicted in FIG. 22) may transmit a connection complete message to the first gateway entity via the first AP, as described above.

Process 1800 may include additional aspects, such as any single aspect or any combination of aspects described below and/or in connection with one or more other processes described elsewhere herein.

In a first aspect, process 1800 includes establishing security with the first network entity via one or more NAS operations.

In a second aspect, alone or in combination with the first aspect, process 1800 includes establishing a bearer with the first network entity via one or more NAS operations.

In a third aspect, alone or in combination with one or more of the first and second aspects, the connection setup message is an RRC message.

In a fourth aspect, alone or in combination with one or more of the first through third aspects, the connection setup message includes a UE ID, a gateway ID, and/or a message type ID.

In a fifth aspect, alone or in combination with one or more of the first through fourth aspects, the UE is configured with an L1 configuration, a MAC configuration, or an RLC configuration that is inactive.

In a sixth aspect, alone or in combination with one or more of the first through fifth aspects, process 1800 includes activating the L1 configuration, the MAC configuration, or the RLC configuration based at least in part on the first cellular connection.

In a seventh aspect, alone or in combination with one or more of the first through sixth aspects, the UE is not configured with any L1 configuration, any MAC configuration, or any RLC configuration.

In an eighth aspect, alone or in combination with one or more of the first through seventh aspects, process 1800 includes receiving an L1 configuration, a MAC configuration, or an RLC configuration based at least in part on the first cellular connection.

In a ninth aspect, alone or in combination with one or more of the first through eighth aspects, the first cellular connection, for a control plane, is established at an RRC layer and a PDCP layer between the UE and the first network entity via the first AP and the first gateway entity.

In a tenth aspect, alone or in combination with one or more of the first through ninth aspects, the first cellular connection, for a user plane, is established at an SDAP layer and a PDCP layer between the UE and the first network entity via the first AP and the first gateway entity.

In an eleventh aspect, alone or in combination with one or more of the first through tenth aspects, the first network entity is a CU, and process 1800 includes transmitting a measurement report to the first gateway entity, receiving a UE context modification request with an HO command from the first network entity via the first gateway entity, transmitting a random access channel (RACH) message to a second network entity that is a distributed unit, receiving a random access response from the second network entity, and transmitting a reconfiguration complete message to the second network entity, the reconfiguration complete message being associated with a second cellular connection to the second network entity.

In a twelfth aspect, alone or in combination with one or more of the first through eleventh aspects, process 1800 includes transmitting a measurement report to the first gateway entity, receiving a UE context modification request with an HO command from the first network entity via the first gateway entity, establishing a second non-cellular connection with a second AP, and transmitting a reconfiguration complete message to a second gateway entity, the reconfiguration complete message being associated with a second cellular connection between the UE and the first network entity via the second gateway entity.

In a thirteenth aspect, alone or in combination with one or more of the first through twelfth aspects, the UE is configured with an L1 configuration, a MAC configuration, or an RLC configuration, and process 1800 includes deactivating the L1 configuration, the MAC configuration, or the RLC configuration based at least in part on the second non-cellular connection.

In a fourteenth aspect, alone or in combination with one or more of the first through thirteenth aspects, the UE is configured with an L1 configuration, a MAC configuration, or an RLC configuration, and process 1800 includes removing the L1 configuration, the MAC configuration, or the RLC configuration based at least in part on the second non-cellular connection.

In a fifteenth aspect, alone or in combination with one or more of the first through fourteenth aspects, process 1800 includes establishing a second cellular connection with a second network entity that is a distributed unit, transmitting a measurement report to the second network entity, receiving a UE context modification request with an HO command from the second network entity, establishing a second non-cellular connection with a second AP, and transmitting a reconfiguration complete message to a second gateway entity, the reconfiguration complete message being associated with a third cellular connection between the UE and the first network entity via the second gateway entity.

In a sixteenth aspect, alone or in combination with one or more of the first through fifteenth aspects, process 1800 includes initializing one or more bearer IDs based at least in part on the first non-cellular connection.

In a seventeenth aspect, alone or in combination with one or more of the first through sixteenth aspects, process 1800 includes incrementing a bearer ID of the one or more bearer IDs based at least in part on a second non-cellular connection.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
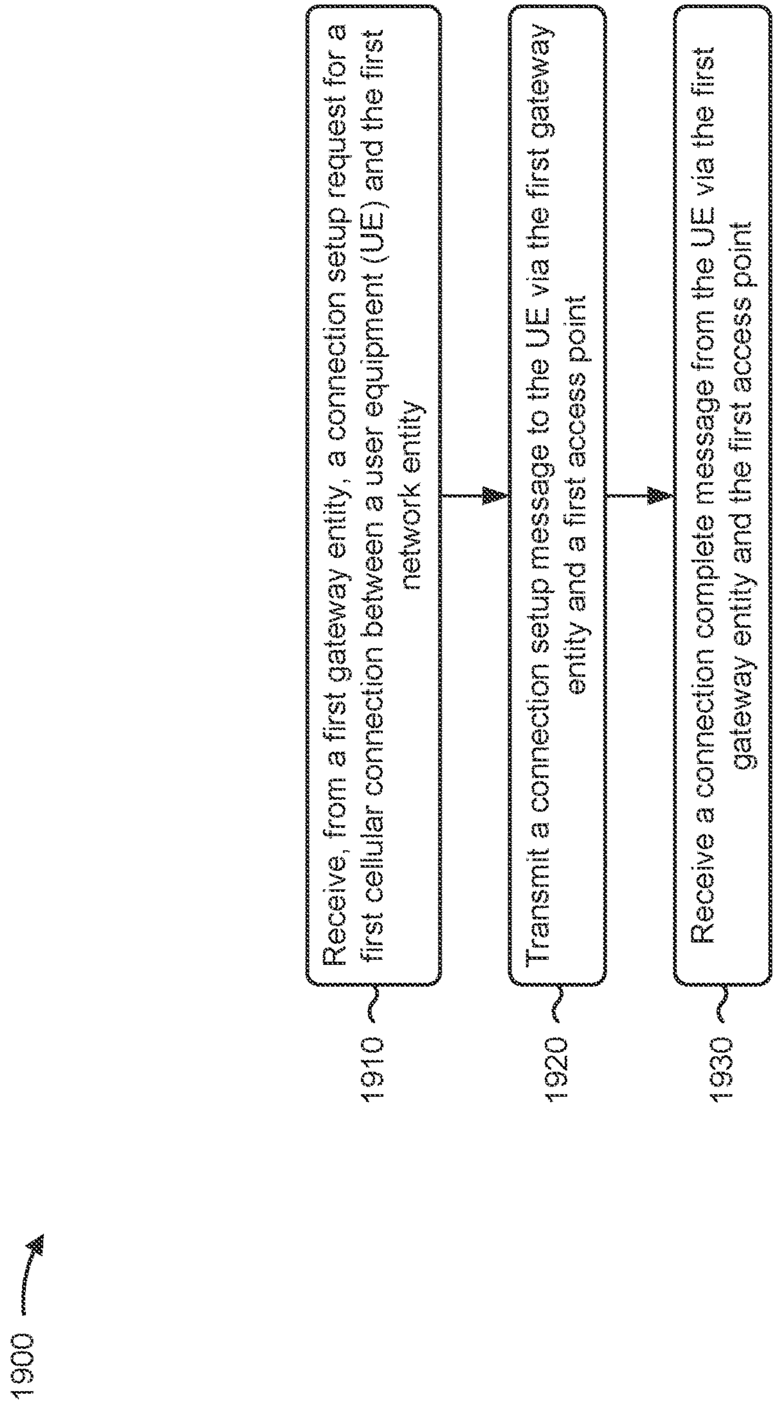
FIG. 19 is a diagram illustrating an example process performed, for example, at a first network entity or an apparatus of a first network entity, in accordance with the present disclosure.

FIG. 19 is a diagram illustrating an example process 1900 performed, for example, at a first network entity or an apparatus of a first network entity, in accordance with the present disclosure. Example process 1900 is an example where the apparatus or the first network entity (e.g., network node 110, gNB-CU 925, gNB-DU 1310) performs operations associated with establishing a cellular connection with an AP via gateway.

As shown in FIG. 19, in some aspects, process 1900 may include receiving, from a first gateway entity, a connection setup request for a first cellular connection between a UE and the first network entity (block 1910). For example, the first network entity (e.g., using reception component 2302 and/or communication manager 2306, depicted in FIG. 23) may receive, from a first gateway entity, a connection setup request for a first cellular connection between a UE and the first network entity, as described above.

As further shown in FIG. 19, in some aspects, process 1900 may include transmitting a connection setup message to the UE via the first gateway entity and a first AP (block 1920). For example, the first network entity (e.g., using transmission component 2304 and/or communication manager 2306, depicted in FIG. 23) may transmit a connection setup message to the UE via the first gateway entity and a first AP, as described above.

As further shown in FIG. 19, in some aspects, process 1900 may include receiving a connection complete message from the UE via the first gateway entity and the first AP (block 1930). For example, the first network entity (e.g., using reception component 2302 and/or communication manager 2306, depicted in FIG. 23) may receive a connection complete message from the UE via the first gateway entity and the first AP, as described above.

Process 1900 may include additional aspects, such as any single aspect or any combination of aspects described below and/or in connection with one or more other processes described elsewhere herein.

In a first aspect, the connection setup message includes one or more of a gateway entity ID, a UE ID, a message type ID, or a C-RNTI.

In a second aspect, alone or in combination with the first aspect, process 1900 includes establishing one or more of security or a bearer with the UE via one or more NAS operations.

In a third aspect, alone or in combination with one or more of the first and second aspects, process 1900 includes transmitting an L1 configuration, a MAC configuration, or an RLC configuration to the UE.

In a fourth aspect, alone or in combination with one or more of the first through third aspects, the first cellular connection, for a control plane, is established at an RRC layer and a PDCP layer between the UE and the first network entity via the first AP and the first gateway entity, and an F1-AP layer, an SCTP layer, an IP layer, and an L1/L2 layer between the first gateway entity and the first network entity.

In a fifth aspect, alone or in combination with one or more of the first through fourth aspects, the first cellular connection, for a user plane, is established at an SDAP layer and a PDCP layer between the UE and the first network entity via the first AP and the first gateway entity, and a GTP-U layer, a UDP layer, an IP layer, and an L1/L2 layer between the first gateway entity and the first network entity.

In a sixth aspect, alone or in combination with one or more of the first through fifth aspects, the first network entity is a CU, and process 1900 includes receiving a transfer message from the first gateway entity with a measurement report from the UE, transmitting a UE context setup request to a second network entity that is a distributed unit, receiving a UE context setup response from the second network entity, transmitting a UE context modification request to the first gateway entity, receiving a UE context modification response from the first gateway entity, receiving a transfer message from the second network entity, the transfer message being associated with a second cellular connection to the UE, and transmitting a UE context release message to the first gateway entity.

In a seventh aspect, alone or in combination with one or more of the first through sixth aspects, process 1900 includes receiving a transfer message from the first gateway entity with a measurement report from the UE, transmitting a UE context setup request to a second gateway entity, receiving a UE context setup response from the second gateway entity, transmitting a UE context modification request to the first gateway entity, receiving a UE context modification response from the first gateway entity, receiving a transfer message from the second gateway entity, the transfer message being associated with a second non-cellular connection to the UE, and transmitting a UE context release message to the first gateway entity.

In an eighth aspect, alone or in combination with one or more of the first through seventh aspects, process 1900 includes receiving a transfer message from a second gateway entity with a measurement report from the UE, transmitting a UE context setup request to the second gateway entity, receiving a UE context setup response from the second gateway entity, transmitting a UE context modification request to a second network entity, receiving a UE context modification response from the second network entity, receiving a transfer message from the second gateway entity, the transfer message being associated with a second non-cellular connection to the UE, and transmitting a UE context release message to the second network entity.

In a ninth aspect, alone or in combination with one or more of the first through eighth aspects, process 1900 includes transmitting initial values for one or more bearer IDs that are associated with a non-cellular connection.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
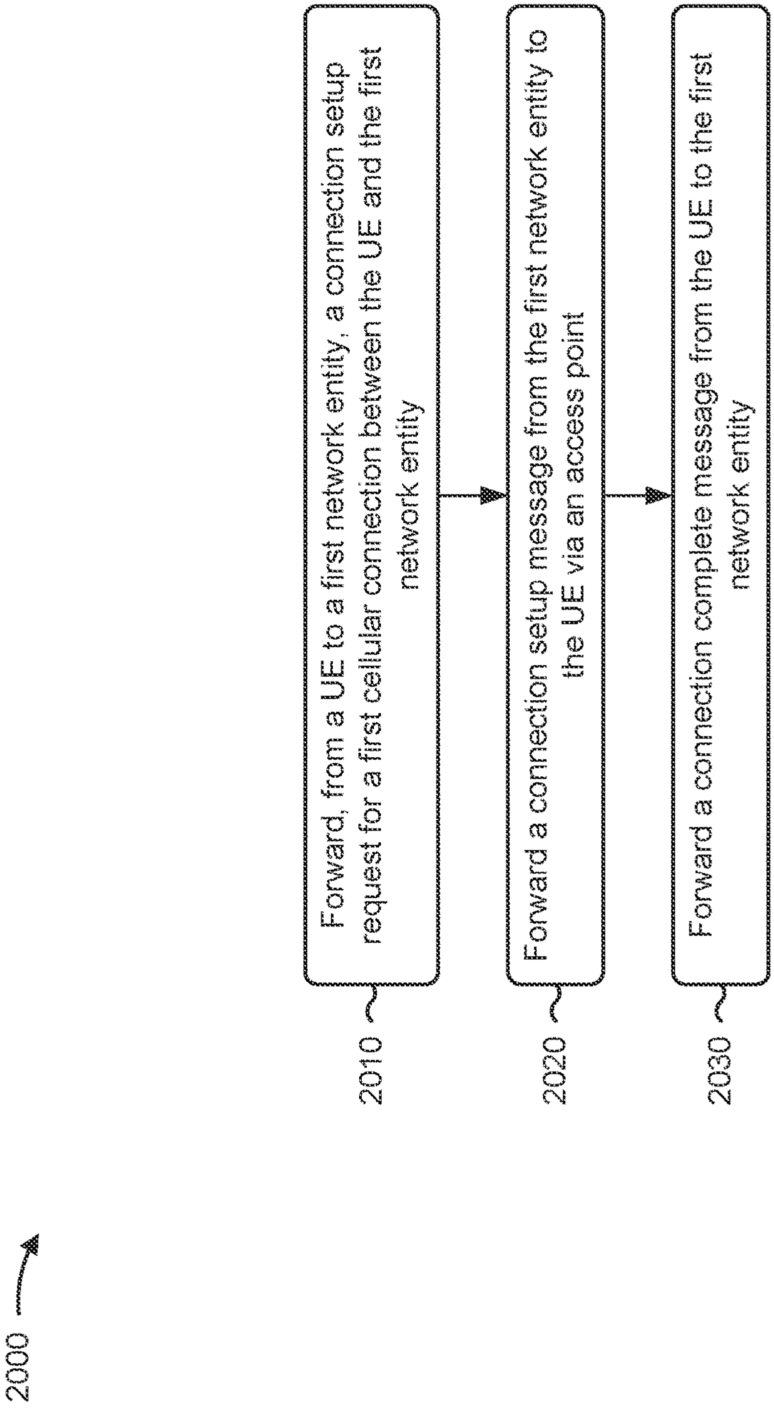
FIG. 20 is a diagram illustrating an example process performed, for example, at a first gateway entity or an apparatus of a first gateway entity, in accordance with the present disclosure.

FIG. 20 is a diagram illustrating an example process 2000 performed, for example, at a first gateway entity or an apparatus of a first gateway entity, in accordance with the present disclosure. Example process 2000 is an example where the apparatus or the first gateway entity (e.g., gateway entity 130, GWF 920) performs operations associated with establishing a cellular connection over an AP.

As shown in FIG. 20, in some aspects, process 2000 may include forwarding, from a UE to a first network entity, a connection setup request for a first cellular connection between the UE and the first network entity (block 2010). For example, the first gateway entity (e.g., using communication manager 2406, depicted in FIG. 24) may forward, from a UE to a first network entity, a connection setup request for a first cellular connection between the UE and the first network entity, as described above.

As further shown in FIG. 20, in some aspects, process 2000 may include forwarding a connection setup message from the first network entity to the UE via an AP (block 2020). For example, the first gateway entity (e.g., using communication manager 2406, reception component 2402, and/or transmission component 2404, depicted in FIG. 24) may forward a connection setup message from the first network entity to the UE via an AP, as described above.

As further shown in FIG. 20, in some aspects, process 2000 may include forwarding a connection complete message from the UE to the first network entity (block 2030). For example, the first gateway entity (e.g., using communication manager 2406, reception component 2402, and/or transmission component 2404, depicted in FIG. 24) may forward a connection complete message from the UE to the first network entity, as described above.

Process 2000 may include additional aspects, such as any single aspect or any combination of aspects described below and/or in connection with one or more other processes described elsewhere herein.

In a first aspect, a first non-cellular connection, for a control plane, is established at IP layer and a PDCP layer between the first gateway entity and a first AP. and the first cellular connection, for the control plane, is established at an F1-AP layer, an SCTP layer, an IP layer, and L1/L2 layer between the first gateway entity and the first network entity.

In a second aspect, alone or in combination with the first aspect, a first non-cellular connection, for a user plane, is established at an SDAP layer and a PDCP layer between the first gateway entity and a first AP, and the first cellular connection, for the user plane, is established at a GTP-U layer, a UDP layer, an IP layer, and an L1/L2 layer between the first gateway entity and the first network entity.

In a third aspect, alone or in combination with one or more of the first and second aspects, the first network entity is a CU, and process 2000 includes forwarding a measurement report from the UE to the first network entity, receiving a UE context modification request from the first gateway entity, transmitting a UE context modification response to the first gateway entity, forwarding a RACH message from the UE to a second network entity that is a distributed unit, forwarding a random access response from the second network entity to the UE via a first AP, and receiving a UE context release message from the first gateway entity.

In a fourth aspect, alone or in combination with one or more of the first through third aspects, process 2000 includes forwarding a measurement report from the UE to the first network entity, receiving a UE context modification request from the first gateway entity, transmitting a UE context modification response to the first gateway entity, forwarding a reconfiguration complete message from the UE to a second gateway entity, and receiving a UE context release message from the first gateway entity.

In a fifth aspect, alone or in combination with one or more of the first through fourth aspects, process 2000 includes receiving a UE context setup request from the first gateway entity, transmitting a UE context setup response to the first gateway entity, receiving a reconfiguration complete message from the UE via a second AP, the reconfiguration complete message being associated with a second cellular connection between the UE and the first network entity via a second gateway entity, and transmitting a transfer message to the first network entity based at least in part on the reconfiguration complete message.

In a sixth aspect, alone or in combination with one or more of the first through fifth aspects, process 2000 includes receiving a UE context setup request from the first gateway entity, transmitting a UE context setup response to the first gateway entity, receiving a reconfiguration complete message from the UE via a second AP, the reconfiguration complete message being associated with a second cellular connection between the UE and the first network entity via a second gateway entity, and transmitting a transfer message to the first network entity based at least in part on the reconfiguration complete message that is associated with the second cellular connection.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
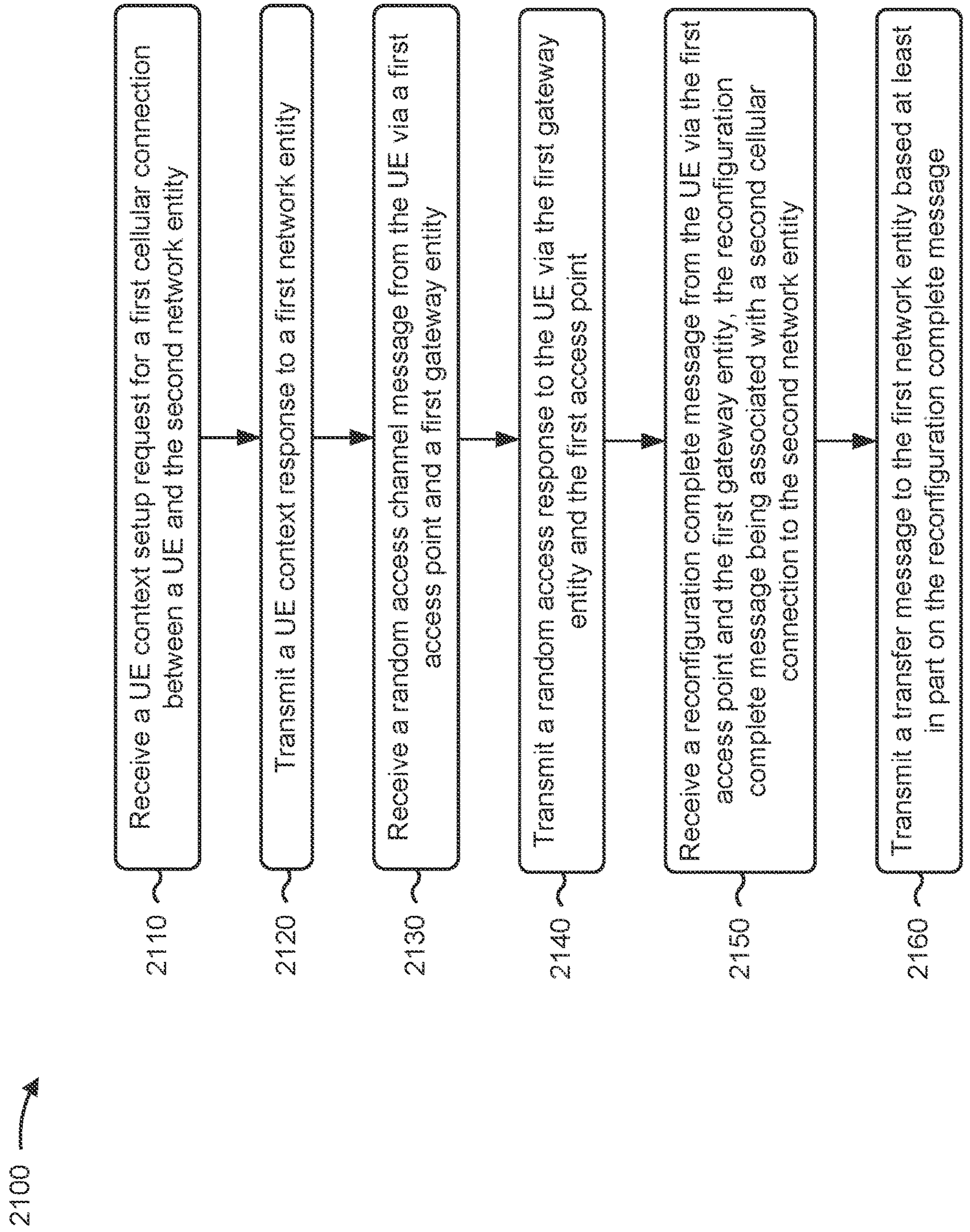
FIG. 21 is a diagram illustrating an example process performed, for example, at a second network entity or an apparatus of a second network entity, in accordance with the present disclosure.

FIG. 21 is a diagram illustrating an example process 2100 performed, for example, at a second network entity or an apparatus of a second network entity, in accordance with the present disclosure. Example process 2100 is an example where the apparatus or the second network entity (e.g., network node 110, gNB-DU 1310, gNB-CU 925) performs operations associated with establishing a cellular connection over an AP via a gateway.

As shown in FIG. 21, in some aspects, process 2100 may include receiving a UE context setup request for a first cellular connection between a UE and the second network entity (block 2110). For example, the second network entity (e.g., using reception component 2302 and/or communication manager 2306, depicted in FIG. 23) may receive a UE context setup request for a first cellular connection between a UE and the second network entity, as described above.

As further shown in FIG. 21, in some aspects, process 2100 may include transmitting a UE context response to a first network entity (block 2120). For example, the second network entity (e.g., using transmission component 2304 and/or communication manager 2306, depicted in FIG. 23) may transmit a UE context response to a first network entity, as described above.

As further shown in FIG. 21, in some aspects, process 2100 may include receiving a random access channel message from the UE via a first AP and a first gateway entity (block 2130). For example, the second network entity (e.g., using reception component 2302 and/or communication manager 2306, depicted in FIG. 23) may receive a random access channel message from the UE via a first AP and a first gateway entity, as described above.

As further shown in FIG. 21, in some aspects, process 2100 may include transmitting a random access response to the UE via the first gateway entity and the first AP (block 2140). For example, the second network entity (e.g., using transmission component 2304 and/or communication manager 2306, depicted in FIG. 23) may transmit a random access response to the UE via the first gateway entity and the first AP, as described above.

As further shown in FIG. 21, in some aspects, process 2100 may include receiving a reconfiguration complete message from the UE via the first AP and the first gateway entity, the reconfiguration complete message being associated with a second cellular connection to the second network entity (block 2150). For example, the second network entity (e.g., using reception component 2302 and/or communication manager 2306, depicted in FIG. 23) may receive a reconfiguration complete message from the UE via the first AP and the first gateway entity, the reconfiguration complete message being associated with a second cellular connection to the second network entity, as described above.

As further shown in FIG. 21, in some aspects, process 2100 may include transmitting a transfer message to the first network entity based at least in part on the reconfiguration complete message (block 2160). For example, the second network entity (e.g., using transmission component 2304 and/or communication manager 2306, depicted in FIG. 23) may transmit a transfer message to the first network entity based at least in part on the reconfiguration complete message, as described above.

Process 2100 may include additional aspects, such as any single aspect or any combination of aspects described below and/or in connection with one or more other processes described elsewhere herein.

In a first aspect, the second network entity is a DU.

In a second aspect, alone or in combination with the first aspect, process 2100 includes establishing one or more of security or a bearer with the UE via one or more NAS operations.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
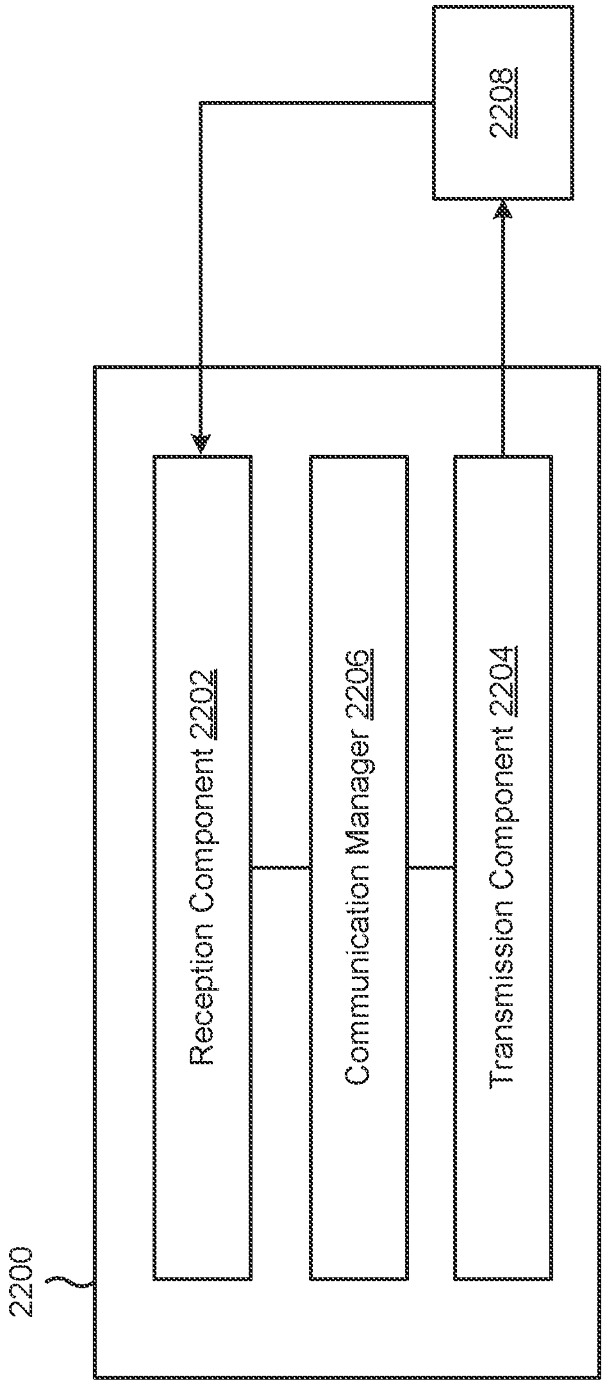
FIG. 22 is a diagram of an example apparatus for wireless communication, in accordance with the present disclosure.

FIG. 22 is a diagram of an example apparatus 2200 for wireless communication, in accordance with the present disclosure. The apparatus 2200 may be a UE, or a UE may include the apparatus 2200. In some aspects, the apparatus 2200 includes a reception component 2202, a transmission component 2204, and/or a communication manager 2206, which may be in communication with one another (for example, via one or more buses and/or one or more other components). In some aspects, the communication manager 2206 is the communication manager 140 described in connection with FIG. 1. As shown, the apparatus 2200 may communicate with another apparatus 2208, such as a UE or a network node (such as a CU, a DU, an RU, or a base station), using the reception component 2202 and the transmission component 2204.

In some aspects, the apparatus 2200 may be configured to perform one or more operations described herein in connection with FIGS. 1-17. Additionally, or alternatively, the apparatus 2200 may be configured to perform one or more processes described herein, such as process 1800 of FIG. 18. In some aspects, the apparatus 2200 and/or one or more components shown in FIG. 22 may include one or more components of the UE described in connection with FIG. 2. Additionally, or alternatively, one or more components shown in FIG. 22 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 2202 may receive communications, such as reference signals, control information, data communications, or a combination thereof, from the apparatus 2208. The reception component 2202 may provide received communications to one or more other components of the apparatus 2200. In some aspects, the reception component 2202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2200. In some aspects, the reception component 2202 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 2204 may transmit communications, such as reference signals, control information, data communications, or a combination thereof, to the apparatus 2208. In some aspects, one or more other components of the apparatus 2200 may generate communications and may provide the generated communications to the transmission component 2204 for transmission to the apparatus 2208. In some aspects, the transmission component 2204 may perform signal processing on the generated communications (such as filtering, amplification, modulation, digital-to-analog conversion, multiplexing, interleaving, mapping, or encoding, among other examples), and may transmit the processed signals to the apparatus 2208. In some aspects, the transmission component 2204 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 2204 may be co-located with the reception component 2202 in one or more transceivers.

The communication manager 2206 may support operations of the reception component 2202 and/or the transmission component 2204. For example, the communication manager 2206 may receive information associated with configuring reception of communications by the reception component 2202 and/or transmission of communications by the transmission component 2204. Additionally, or alternatively, the communication manager 2206 may generate and/or provide control information to the reception component 2202 and/or the transmission component 2204 to control reception and/or transmission of communications.

The communication manager 2206 may establish a first non-cellular connection with a first AP. The transmission component 2204 may transmit, to a first gateway entity via the first AP, a connection setup request for a first cellular connection between the UE and a first network entity. The reception component 2202 may receive a connection setup message from the first gateway entity via the first AP. The transmission component 2204 may transmit a connection complete message to the first gateway entity via the first AP.

The communication manager 2206 may establish security with the first network entity via one or more NAS operations. The communication manager 2206 may establish a bearer with the first network entity via one or more NAS operations.

The communication manager 2206 may activate the L1 configuration, the MAC configuration, or the RLC configuration based at least in part on the first cellular connection. The reception component 2202 may receive an L1 configuration, a MAC configuration, or an RLC configuration based at least in part on the first cellular connection.

The transmission component 2204 may transmit a measurement report to the first gateway entity. The reception component 2202 may receive a UE context modification request with an HO command from the first network entity via the first gateway entity. The communication manager 2206 may establish a second non-cellular connection with a second AP. The transmission component 2204 may transmit a reconfiguration complete message to a second gateway entity, the reconfiguration complete message being associated with a second cellular connection between the UE and the first network entity via the second gateway entity. The communication manager 2206 may establish a second cellular connection with a second network entity that is a DU. The transmission component 2204 may transmit a measurement report to the second network entity. The reception component 2202 may receive a UE context modification request with an HO command from the second network entity. The communication manager 2206 may establish a second non-cellular connection with a second AP. The transmission component 2204 may transmit a reconfiguration complete message to a second gateway entity, the reconfiguration complete message being associated with a third cellular connection between the UE and the first network entity via the second gateway entity.

The communication manager 2206 may initialize one or more bearer IDs based at least in part on the first non-cellular connection. The communication manager 2206 may increment a bearer ID of the one or more bearer IDs based at least in part on a second non-cellular connection.

The number and arrangement of components shown in FIG. 22 are provided as an example. In practice, there may be additional components, fewer components, different components, or differently arranged components than those shown in FIG. 22. Furthermore, two or more components shown in FIG. 22 may be implemented within a single component, or a single component shown in FIG. 22 may be implemented as multiple, distributed components. Additionally, or alternatively, a set of (one or more) components shown in FIG. 22 may perform one or more functions described as being performed by another set of components shown in FIG. 22.

Figure 23:
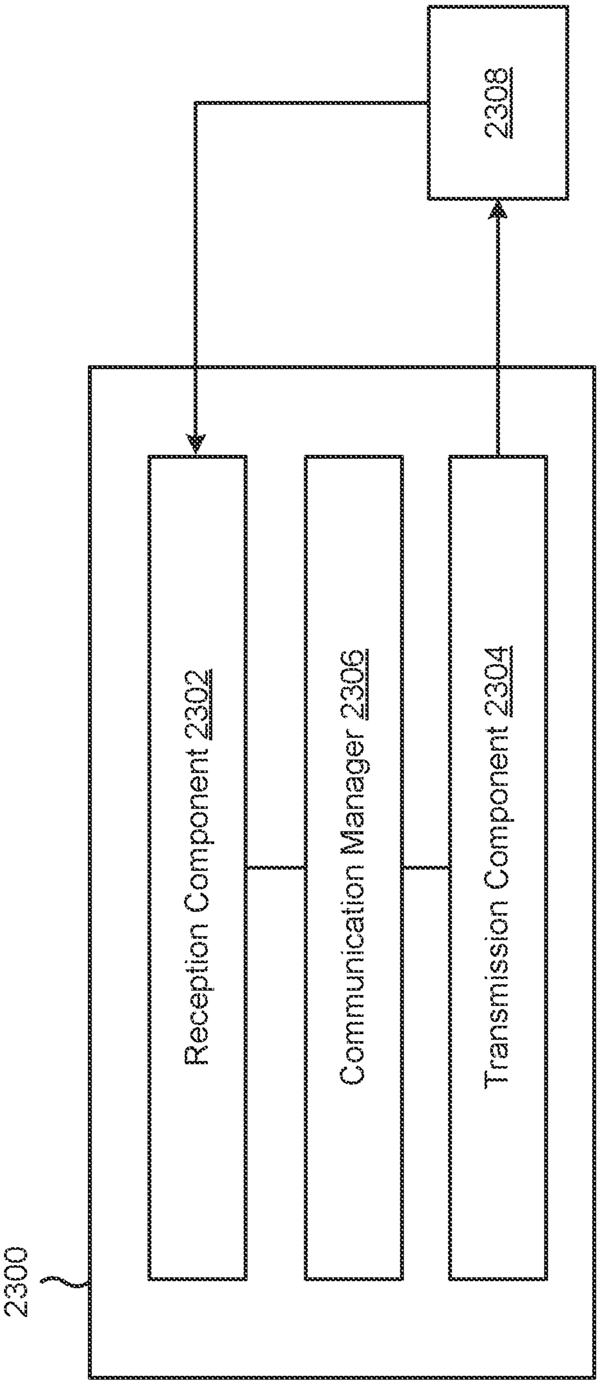
FIG. 23 is a diagram of an example apparatus for wireless communication, in accordance with the present disclosure.

FIG. 23 is a diagram of an example apparatus 2300 for wireless communication, in accordance with the present disclosure. The apparatus 2300 may be a network entity, or a network entity may include the apparatus 2300. In some aspects, the apparatus 2300 includes a reception component 2302, a transmission component 2304, and/or a communication manager 2306, which may be in communication with one another (for example, via one or more buses and/or one or more other components). In some aspects, the communication manager 2306 is the communication manager 150 described in connection with FIG. 1. As shown, the apparatus 2300 may communicate with another apparatus 2308, such as a UE or a network node (such as a CU, a DU, an RU, or a base station), using the reception component 2302 and the transmission component 2304.

In some aspects, the apparatus 2300 may be configured to perform one or more operations described herein in connection with FIGS. 1-17. Additionally, or alternatively, the apparatus 2300 may be configured to perform one or more processes described herein, such as process 1900 of FIG. 19, process 2100 of FIG. 21, or a combination thereof. In some aspects, the apparatus 2300 and/or one or more components shown in FIG. 23 may include one or more components of the network entity described in connection with FIG. 2. Additionally, or alternatively, one or more components shown in FIG. 23 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 2302 may receive communications, such as reference signals, control information, data communications, or a combination thereof, from the apparatus 2308. The reception component 2302 may provide received communications to one or more other components of the apparatus 2300. In some aspects, the reception component 2302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2300. In some aspects, the reception component 2302 may include one or more antennas, one or more modems, one or more demodulators, one or more MIMO detectors, one or more receive processors, one or more controllers/processors, one or more memories, or a combination thereof, of the network entity described in connection with FIG. 2.

The transmission component 2304 may transmit communications, such as reference signals, control information, data communications, or a combination thereof, to the apparatus 2308. In some aspects, one or more other components of the apparatus 2300 may generate communications and may provide the generated communications to the transmission component 2304 for transmission to the apparatus 2308. In some aspects, the transmission component 2304 may perform signal processing on the generated communications (such as filtering, amplification, modulation, digital-to-analog conversion, multiplexing, interleaving, mapping, or encoding, among other examples), and may transmit the processed signals to the apparatus 2308. In some aspects, the transmission component 2304 may include one or more antennas, one or more modems, one or more modulators, one or more transmit MIMO processors, one or more transmit processors, one or more controllers/processors, one or more memories, or a combination thereof, of the network entity described in connection with FIG. 2. In some aspects, the transmission component 2304 may be co-located with the reception component 2302 in one or more transceivers.

The communication manager 2306 may support operations of the reception component 2302 and/or the transmission component 2304. For example, the communication manager 2306 may receive information associated with configuring reception of communications by the reception component 2302 and/or transmission of communications by the transmission component 2304. Additionally, or alternatively, the communication manager 2306 may generate and/or provide control information to the reception component 2302 and/or the transmission component 2304 to control reception and/or transmission of communications.

In some aspects, at a first network entity, the reception component 2302 may receive, from a first gateway entity, a connection setup request for a first cellular connection between a UE and the first network entity. The transmission component 2304 may transmit a connection setup message to the UE via the first gateway entity and a first AP. The reception component 2302 may receive a connection complete message from the UE via the first gateway entity and the first AP. The communication manager 2306 may establish one or more of security or a bearer with the UE via one or more NAS operations.

The transmission component 2304 may transmit an L1 configuration, a MAC configuration, or a an RLC configuration to the UE.

The reception component 2302 may receive a transfer message from the first gateway entity with a measurement report from the UE. The transmission component 2304 may transmit a UE context setup request to a second gateway entity. The reception component 2302 may receive a UE context setup response from the second gateway entity. The transmission component 2304 may transmit a UE context modification request to the first gateway entity. The reception component 2302 may receive a UE context modification response from the first gateway entity. The reception component 2302 may receive a transfer message from the second gateway entity, the transfer message being associated with a second non-cellular connection to the UE.

The transmission component 2304 may transmit a UE context release message to the first gateway entity. The reception component 2302 may receive a transfer message from a second gateway entity with a measurement report from the UE. The transmission component 2304 may transmit a UE context setup request to the second gateway entity. The reception component 2302 may receive a UE context setup response from the second gateway entity. The transmission component 2304 may transmit a UE context modification request to a second network entity. The reception component 2302 may receive a UE context modification response from the second network entity. The reception component 2302 may receive a transfer message from the second gateway entity, the transfer message being associated with a second non-cellular connection to the UE. The transmission component 2304 may transmit a UE context release message to the second network entity.

The transmission component 2304 may transmit initial values for one or more bearer IDs that are associated with a non-cellular connection.

In some aspects, at a second network entity, the reception component 2302 may receive a UE context setup request for a first cellular connection between a UE and the second network entity. The transmission component 2304 may transmit a UE context response to a first network entity. The reception component 2302 may receive a RACH message from the UE via a first AP and a first gateway entity. The transmission component 2304 may transmit a random access response to the UE via the first gateway entity and the first AP. The reception component 2302 may receive a reconfiguration complete message from the UE via the first AP and the first gateway entity, the reconfiguration complete message being associated with a second cellular connection to the second network entity. The transmission component 2304 may transmit a transfer message to the first network entity based at least in part on the reconfiguration complete message.

The communication manager 2306 may establish one or more of security or a bearer with the UE via one or more NAS operations.

The number and arrangement of components shown in FIG. 23 are provided as an example. In practice, there may be additional components, fewer components, different components, or differently arranged components than those shown in FIG. 23. Furthermore, two or more components shown in FIG. 23 may be implemented within a single component, or a single component shown in FIG. 23 may be implemented as multiple, distributed components. Additionally, or alternatively, a set of (one or more) components shown in FIG. 23 may perform one or more functions described as being performed by another set of components shown in FIG. 23.

Figure 24:
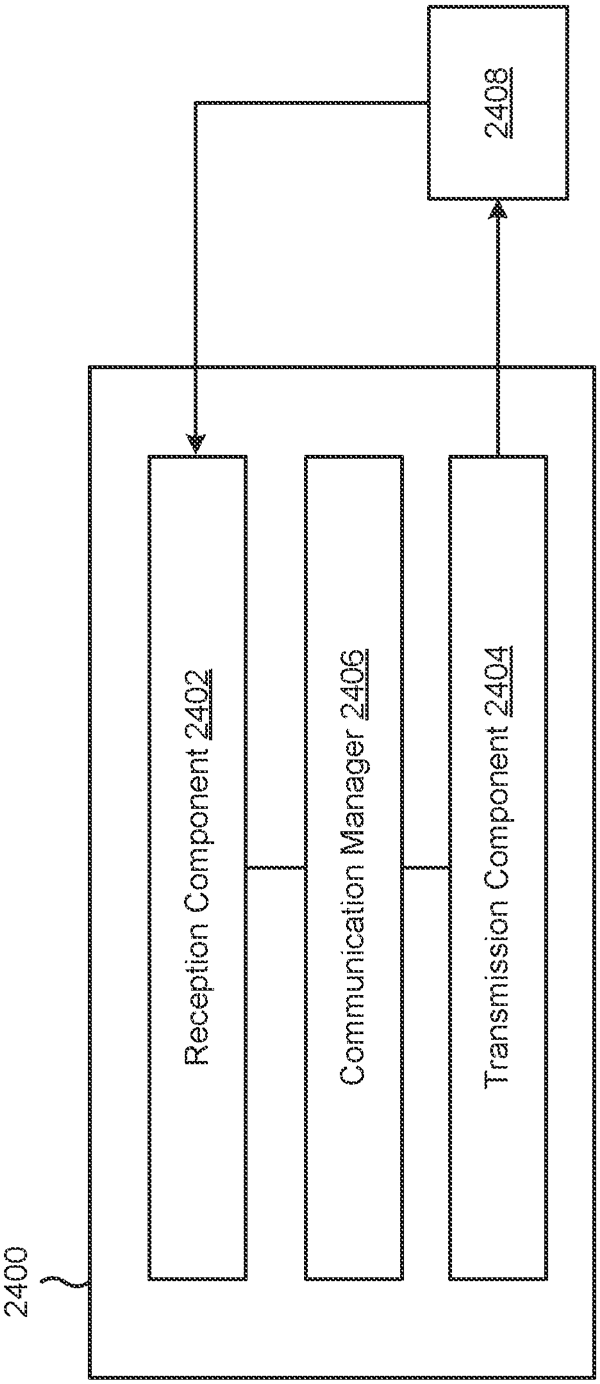
FIG. 24 is a diagram of an example apparatus for wireless communication, in accordance with the present disclosure.

FIG. 24 is a diagram of an example apparatus 2400 for wireless communication, in accordance with the present disclosure. The apparatus 2400 may be a gateway entity, or a gateway entity may include the apparatus 2400. In some aspects, the apparatus 2400 includes a reception component 2402, a transmission component 2404, and/or a communication manager 2406, which may be in communication with one another (for example, via one or more buses and/or one or more other components). In some aspects, the communication manager 2406 is the communication manager 160 described in connection with FIG. 1. As shown, the apparatus 2400 may communicate with another apparatus 2408, such as a UE or a network node (such as a CU, a DU, an RU, or a base station), using the reception component 2402 and the transmission component 2404.

In some aspects, the apparatus 2400 may be configured to perform one or more operations described herein in connection with FIGS. 1-17. Additionally, or alternatively, the apparatus 2400 may be configured to perform one or more processes described herein, such as process 2000 of FIG. 20. In some aspects, the apparatus 2400 and/or one or more components shown in FIG. 24 may include one or more components of the gateway entity described in connection with FIG. 2. Additionally, or alternatively, one or more components shown in FIG. 24 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 2402 may receive communications, such as reference signals, control information, data communications, or a combination thereof, from the apparatus 2408. The reception component 2402 may provide received communications to one or more other components of the apparatus 2400. In some aspects, the reception component 2402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2400. In some aspects, the reception component 2402 may include one or more antennas, one or more modems, one or more demodulators, one or more MIMO detectors, one or more receive processors, one or more controllers/processors, one or more memories, or a combination thereof, of the gateway entity described in connection with FIG. 2.

The transmission component 2404 may transmit communications, such as reference signals, control information, data communications, or a combination thereof, to the apparatus 2408. In some aspects, one or more other components of the apparatus 2400 may generate communications and may provide the generated communications to the transmission component 2404 for transmission to the apparatus 2408. In some aspects, the transmission component 2404 may perform signal processing on the generated communications (such as filtering, amplification, modulation, digital-to-analog conversion, multiplexing, interleaving, mapping, or encoding, among other examples), and may transmit the processed signals to the apparatus 2408. In some aspects, the transmission component 2404 may include one or more antennas, one or more modems, one or more modulators, one or more transmit MIMO processors, one or more transmit processors, one or more controllers/processors, one or more memories, or a combination thereof, of the gateway entity described in connection with FIG. 2. In some aspects, the transmission component 2404 may be co-located with the reception component 2402 in one or more transceivers.

The communication manager 2406 may support operations of the reception component 2402 and/or the transmission component 2404. For example, the communication manager 2406 may receive information associated with configuring reception of communications by the reception component 2402 and/or transmission of communications by the transmission component 2404. Additionally, or alternatively, the communication manager 2406 may generate and/or provide control information to the reception component 2402 and/or the transmission component 2404 to control reception and/or transmission of communications.

In some aspects, at a gateway entity, the communication manager 2406 may forward, from a UE to a first network entity, a connection setup request for a first cellular connection between the UE and the first network entity. The communication manager 2406 may forward a connection setup message from the first network entity to the UE via an AP. The communication manager 2406 may forward a connection complete message from the UE to the first network entity.

The communication manager 2406 may forward a measurement report from the UE to the first network entity. The reception component 2402 may receive a UE context modification request from the first gateway entity. The transmission component 2404 may transmit a UE context modification response to the first gateway entity. The communication manager 2406 may forward a reconfiguration complete message from the UE to a second gateway entity. The reception component 2402 may receive a UE context release message from the first gateway entity. The reception component 2402 may receive a UE context setup request from the first gateway entity.

The transmission component 2404 may transmit a UE context setup response to the first gateway entity. The reception component 2402 may receive a reconfiguration complete message from the UE via a second AP, the reconfiguration complete message being associated with a second cellular connection between the UE and the first network entity via a second gateway entity. The transmission component 2404 may transmit a transfer message to the first network entity based at least in part on the reconfiguration complete message.

The reception component 2402 may receive a UE context setup request from the first gateway entity. The transmission component 2404 may transmit a UE context setup response to the first gateway entity. The reception component 2402 may receive a reconfiguration complete message from the UE via a second AP, the reconfiguration complete message being associated with a second cellular connection between the UE and the first network entity via a second gateway entity. The transmission component 2404 may transmit a transfer message to the first network entity based at least in part on the reconfiguration complete message that is associated with the second cellular connection.

The number and arrangement of components shown in FIG. 24 are provided as an example. In practice, there may be additional components, fewer components, different components, or differently arranged components than those shown in FIG. 24. Furthermore, two or more components shown in FIG. 24 may be implemented within a single component, or a single component shown in FIG. 24 may be implemented as multiple, distributed components. Additionally, or alternatively, a set of (one or more) components shown in FIG. 24 may perform one or more functions described as being performed by another set of components shown in FIG. 24.

The following provides an overview of some Aspects of the present disclosure:

Aspect 1: A method of wireless communication performed by a user equipment (UE), comprising: establishing a first non-cellular connection with a first access point; transmitting, to a first gateway entity via the first access point, a connection setup request for a first cellular connection between the UE and a first network entity; receiving a connection setup message from the first gateway entity via the first access point; and transmitting a connection complete message to the first gateway entity via the first access point.

Aspect 2: The method of Aspect 1, further comprising establishing security with the first network entity via one or more non-access stratum (NAS) operations.

Aspect 3: The method of any of Aspects 1-2, further comprising establishing a bearer with the first network entity via one or more non-access stratum (NAS) operations.

Aspect 4: The method of any of Aspects 1-3, wherein the connection setup message is a radio resource control message.

Aspect 5: The method of any of Aspects 1-4, wherein the connection setup message includes one or more of a UE identifier (ID), a gateway ID, or a message type ID.

Aspect 6: The method of any of Aspects 1-5, wherein the UE is configured with a Layer 1 (L1) configuration, a medium access control (MAC) configuration, or a radio link control (RLC) configuration that is inactive.

Aspect 7: The method of Aspect 6, further comprising activating the L1 configuration, the MAC configuration, or the RLC configuration based at least in part on the first cellular connection.

Aspect 8: The method of any of Aspects 1-5, wherein the UE is not configured with any Layer 1 (L1) configuration, any medium access control (MAC) configuration, or any radio link control (RLC) configuration.

Aspect 9: The method of Aspect 8, further comprising receiving an L1 configuration, a MAC configuration, or an RLC configuration based at least in part on the first cellular connection.

Aspect 10: The method of any of Aspects 1-9, wherein the first cellular connection, for a control plane, is established at a radio resource control (RRC) layer and a packet data convergence protocol (PDCP) layer between the UE and the first network entity via the first access point and the first gateway entity.

Aspect 11: The method of any of Aspects 1-10, wherein the first cellular connection, for a user plane, is established at a service data adaptation protocol (SDAP) layer and a packet data convergence protocol (PDCP) layer between the UE and the first network entity via the first access point and the first gateway entity.

Aspect 12: The method of any of Aspects 1-11, wherein the first network entity is a central unit, and wherein the method includes: transmitting a measurement report to the first gateway entity; receiving a UE context modification request with a handover command from the first network entity via the first gateway entity; transmitting a random access channel message to a second network entity that is a distributed unit; receiving a random access response from the second network entity; and transmitting a reconfiguration complete message to the second network entity, the reconfiguration complete message being associated with a second cellular connection to the second network entity.

Aspect 13: The method of any of Aspects 1-12, further comprising: transmitting a measurement report to the first gateway entity; receiving a UE context modification request with a handover command from the first network entity via the first gateway entity; establishing a second non-cellular connection with a second access point; and transmitting a reconfiguration complete message to a second gateway entity, the reconfiguration complete message being associated with a second cellular connection between the UE and the first network entity via the second gateway entity.

Aspect 14: The method of Aspect 13, wherein the UE is configured with a Layer 1 (L1) configuration, a medium access control (MAC) configuration, or a radio link control (RLC) configuration, and wherein the method includes deactivating the L1 configuration, the MAC configuration, or the RLC configuration based at least in part on the second non-cellular connection.

Aspect 15: The method of Aspect 13, wherein the UE is configured with a Layer 1 (L1) configuration, a medium access control (MAC) configuration, or a radio link control (RLC) configuration, and wherein the method includes removing the L1 configuration, the MAC configuration, or the RLC configuration based at least in part on the second non-cellular connection.

Aspect 16: The method of any of Aspects 1-15, further comprising: establishing a second cellular connection with a second network entity that is a distributed unit; transmitting a measurement report to the second network entity; receiving a UE context modification request with a handover command from the second network entity; establishing a second non-cellular connection with a second access point; and transmitting a reconfiguration complete message to a second gateway entity, the reconfiguration complete message being associated with a third cellular connection between the UE and the first network entity via the second gateway entity.

Aspect 17: The method of any of Aspects 1-16, further comprising initializing one or more bearer identifiers (IDs) based at least in part on the first non-cellular connection.

Aspect 18: The method of Aspect 17, further comprising incrementing a bearer ID of the one or more bearer IDs based at least in part on a second non-cellular connection.

Aspect 19: A method of wireless communication performed by a first network entity, comprising: receiving, from a first gateway entity, a connection setup request for a first cellular connection between a user equipment (UE) and the first network entity; transmitting a connection setup message to the UE via the first gateway entity and a first access point; and receiving a connection complete message from the UE via the first gateway entity and the first access point.

Aspect 20: The method of Aspect 19, wherein the connection setup message includes one or more of a gateway entity identifier (ID), a UE ID, a message type ID, or a cell radio network temporary identifier (C-RNTI).

Aspect 21: The method of any of Aspects 19-20, further comprising establishing one or more of security or a bearer with the UE via one or more non-access stratum (NAS) operations.

Aspect 22: The method of any of Aspects 19-21, further comprising transmitting a Layer 1 (L1) configuration, a medium access control (MAC) configuration, or a radio link control (RLC) configuration to the UE.

Aspect 23: The method of any of Aspects 19-22, wherein the first cellular connection, for a control plane, is established at: a radio resource control (RRC) layer and a packet data convergence protocol (PDCP) layer between the UE and the first network entity via the first access point and the first gateway entity, and an F1 application protocol (F1-AP) layer, a stream control transmission protocol (SCTP) layer, an internet protocol (IP) layer, and a Layer 1 (L1) and Layer 2 (L2) layer between the first gateway entity and the first network entity.

Aspect 24: The method of any of Aspects 19-23, wherein the first cellular connection, for a user plane, is established at: a service data adaptation protocol (SDAP) layer and a packet data convergence protocol (PDCP) layer between the UE and the first network entity via the first access point and the first gateway entity, and a general packet radio system (GPRS) tunneling protocol user plane (GTP-U) layer, a user datagram protocol (UDP) layer, an internet protocol (IP) layer, and a Layer 1 (L1) and Layer 2 (L2) layer between the first gateway entity and the first network entity.

Aspect 25: The method of any of Aspects 19-24, wherein the first network entity is a central unit, and wherein the method includes: receiving a transfer message from the first gateway entity with a measurement report from the UE; transmitting a UE context setup request to a second network entity that is a distributed unit; receiving a UE context setup response from the second network entity; transmitting a UE context modification request to the first gateway entity; receiving a UE context modification response from the first gateway entity; receiving a transfer message from the second network entity, the transfer message being associated with a second cellular connection to the UE; and transmitting a UE context release message to the first gateway entity.

Aspect 26: The method of any of Aspects 19-25, further comprising: receiving a transfer message from the first gateway entity with a measurement report from the UE; transmitting a UE context setup request to a second gateway entity; receiving a UE context setup response from the second gateway entity; transmitting a UE context modification request to the first gateway entity; receiving a UE context modification response from the first gateway entity; receiving a transfer message from the second gateway entity, the transfer message being associated with a second non-cellular connection to the UE; and transmitting a UE context release message to the first gateway entity.

Aspect 27: The method of any of Aspects 19-26, further comprising: receiving a transfer message from a second gateway entity with a measurement report from the UE; transmitting a UE context setup request to the second gateway entity; receiving a UE context setup response from the second gateway entity; transmitting a UE context modification request to a second network entity; receiving a UE context modification response from the second network entity; receiving a transfer message from the second gateway entity, the transfer message being associated with a second non-cellular connection to the UE; and transmitting a UE context release message to the second network entity.

Aspect 28: The method of any of Aspects 19-27, further comprising transmitting initial values for one or more bearer identifiers (IDs) that are associated with a non-cellular connection.

Aspect 29: A method of wireless communication performed by a first gateway entity, comprising: forwarding, from a user equipment (UE) to a first network entity, a connection setup request for a first cellular connection between the UE and the first network entity; forwarding a connection setup message from the first network entity to the UE via an access point; and forwarding a connection complete message from the UE to the first network entity.

Aspect 30: The method of Aspect 29, wherein a first non-cellular connection, for a control plane, is established at an internet protocol (IP) layer and a packet data convergence protocol (PDCP) layer between the first gateway entity and a first access point, and wherein the first cellular connection, for the control plane, is established at an F1 application protocol (F1-AP) layer, a stream control transmission protocol (SCTP) layer, an internet protocol (IP) layer, and a Layer 1 (L1) and Layer 2 (L2) layer between the first gateway entity and the first network entity.

Aspect 31: The method of any of Aspects 29-30, wherein a first non-cellular connection, for a user plane, is established at a service data adaptation protocol (SDAP) layer and a packet data convergence protocol (PDCP) layer between the first gateway entity and a first access point, and wherein the first cellular connection, for the user plane, is established at a general packet radio system (GPRS) tunneling protocol user plane (GTP-U) layer, a user datagram protocol (UDP) layer, an internet protocol (IP) layer, and a Layer 1 (L1) and Layer 2 (L2) layer between the first gateway entity and the first network entity.

Aspect 32: The method of any of Aspects 29-31, wherein the first network entity is a central unit, and wherein the method includes: forwarding a measurement report from the UE to the first network entity; receiving a UE context modification request from the first gateway entity; transmitting a UE context modification response to the first gateway entity; forwarding a random access channel message from the UE to a second network entity that is a distributed unit; forwarding a random access response from the second network entity to the UE via a first access point; and receiving a UE context release message from the first gateway entity.

Aspect 33: The method of any of Aspects 29-32, further comprising: forwarding a measurement report from the UE to the first network entity; receiving a UE context modification request from the first gateway entity; transmitting a UE context modification response to the first gateway entity; forwarding a reconfiguration complete message from the UE to a second gateway entity; and receiving a UE context release message from the first gateway entity.

Aspect 34: The method of any of Aspects 29-33, further comprising: receiving a UE context setup request from the first gateway entity; transmitting a UE context setup response to the first gateway entity; receiving a reconfiguration complete message from the UE via a second access point, the reconfiguration complete message being associated with a second cellular connection between the UE and the first network entity via a second gateway entity; and transmitting a transfer message to the first network entity based at least in part on the reconfiguration complete message.

Aspect 35: The method of any of Aspects 29-34, further comprising: receiving a UE context setup request from the first gateway entity; transmitting a UE context setup response to the first gateway entity; receiving a reconfiguration complete message from the UE via a second access point, the reconfiguration complete message being associated with a second cellular connection between the UE and the first network entity via a second gateway entity; and transmitting a transfer message to the first network entity based at least in part on the reconfiguration complete message that is associated with the second cellular connection.

Aspect 36: A method of wireless communication performed by a second network entity, comprising: receiving a user equipment (UE) context setup request for a first cellular connection between a UE and the second network entity; transmitting a UE context response to a first network entity; receiving a random access channel message from the UE via a first access point and a first gateway entity; transmitting a random access response to the UE via the first gateway entity and the first access point; receiving a reconfiguration complete message from the UE via the first access point and the first gateway entity, the reconfiguration complete message being associated with a second cellular connection to the second network entity; and transmitting a transfer message to the first network entity based at least in part on the reconfiguration complete message.

Aspect 37: The method of Aspect 36, wherein the second network entity is a distributed unit.

Aspect 38: The method of any of Aspects 36-37, further comprising establishing one or more of security or a bearer with the UE via one or more non-access stratum (NAS) operations.

Aspect 39: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-38.

Aspect 40: An apparatus for wireless communication at a device, the apparatus comprising one or more memories and one or more processors coupled to the one or more memories, the one or more processors configured to cause the device to perform the method of one or more of Aspects 1-38.

Aspect 41: An apparatus for wireless communication, the apparatus comprising at least one means for performing the method of one or more of Aspects 1-38.

Aspect 42: A non-transitory computer-readable medium storing code for wireless communication, the code comprising instructions executable by one or more processors to perform the method of one or more of Aspects 1-38.

Aspect 43: A non-transitory computer-readable medium storing a set of instructions for wireless communication, the set of instructions comprising one or more instructions that, when executed by one or more processors of a device, cause the device to perform the method of one or more of Aspects 1-38.

Aspect 44: A device for wireless communication, the device comprising a processing system that includes one or more processors and one or more memories coupled with the one or more processors, the processing system configured to cause the device to perform the method of one or more of Aspects 1-38.

Aspect 45: An apparatus for wireless communication at a device, the apparatus comprising one or more memories and one or more processors coupled to the one or more memories, the one or more processors individually or collectively configured to cause the device to perform the method of one or more of Aspects 1-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
- one or more memories; and
- one or more processors, coupled to the one or more memories, individually or collectively configured to cause the UE to:
  - establish a first non-cellular connection with a first access point;
  - transmit, to a first gateway entity via the first access point, a connection setup request for a first cellular connection between the UE and a first network entity, wherein the first network entity is a central unit, and wherein the first gateway entity is a device located in a core network;
  - receive a connection setup message from the first gateway entity via the first access point;
  - transmit a connection complete message to the first gateway entity via the first access point;
  - receive a UE context modification request with a handover command from the first network entity via the first gateway entity; and
  - establish a second cellular connection to a second network entity via the first gateway entity based on the UE context modification request with the handover command, wherein the second network entity is a distributed unit.

2. The apparatus of claim 1, wherein the one or more processors are individually or collectively configured to cause the UE to establish security with the first network entity via one or more non-access stratum (NAS) operations.

3. The apparatus of claim 1, wherein the one or more processors are individually or collectively configured to cause the UE to establish a bearer with the first network entity via one or more non-access stratum (NAS) operations.

4. The apparatus of claim 1, wherein the connection setup message includes one or more of a UE identifier (ID), a gateway ID, or a message type ID.

5. The apparatus of claim 1, wherein the UE is configured with a Layer 1 (L1) configuration, a medium access control (MAC) configuration, or a radio link control (RLC) configuration that is inactive, and wherein the one or more processors are individually or collectively configured to cause the UE to activate the LI configuration, the MAC configuration, or the RLC configuration based at least in part on the first cellular connection.

6. The apparatus of claim 1, wherein the UE is not configured with any Layer 1 (L1) configuration, any medium access control (MAC) configuration, or any radio link control (RLC) configuration, and wherein the one or more processors are individually or collectively configured to cause the UE to receive an LI configuration, a MAC configuration, or an RLC configuration based at least in part on the first cellular connection.

7. The apparatus of claim 1, wherein the first cellular connection, for a control plane, is established at a radio resource control (RRC) layer and a packet data convergence protocol (PDCP) layer between the UE and the first network entity via the first access point and the first gateway entity, and wherein the first cellular connection, for a user plane, is established at a service data adaptation protocol (SDAP) layer and a PDCP layer between the UE and the first network entity via the first access point and the first gateway entity.

8. The apparatus of claim 1, wherein the one or more processors are individually or collectively configured to cause the UE to:
- transmit a measurement report to the first gateway entity;
- transmit a random access channel message to the second network entity;
- receive a random access response from the second network entity; and
- transmit a reconfiguration complete message to the second network entity, the reconfiguration complete message being associated with the second cellular connection to the second network entity.

9. The apparatus of claim 1, wherein the one or more processors are individually or collectively configured to cause the UE to:
- transmit a measurement report to the first gateway entity;
- receive a UE context modification request with a handover command from the first network entity via the first gateway entity;
- establish a second non-cellular connection with a second access point; and
- transmit a reconfiguration complete message to a second gateway entity, the reconfiguration complete message being associated with a second cellular connection between the UE and the first network entity via the second gateway entity.

10. The apparatus of claim 9, wherein the UE is configured with a Layer 1 (L1) configuration, a medium access control (MAC) configuration, or a radio link control (RLC) configuration, and wherein the one or more processors are individually or collectively configured to cause the UE to deactivate the LI configuration, the MAC configuration, or the RLC configuration based at least in part on the second non-cellular connection.

11. The apparatus of claim 9, wherein the UE is configured with a Layer 1 (L1) configuration, a medium access control (MAC) configuration, or a radio link control (RLC) configuration, and wherein the one or more processors are individually or collectively configured to cause the UE to remove the L1 configuration, the MAC configuration, or the RLC configuration based at least in part on the second non-cellular connection.

12. The apparatus of claim 1, wherein the one or more processors are individually or collectively configured to cause the UE to:

transmit a measurement report to the second network entity;

establish a second non-cellular connection with a second access point; and transmit a reconfiguration complete message to a second gateway entity, the reconfiguration complete message being associated with a third cellular connection between the UE and the first network entity via the second gateway entity.

13. The apparatus of claim 1, wherein the one or more processors are individually or collectively configured to cause the UE to:

initialize one or more bearer identifiers (IDs) based at least in part on the first non-cellular connection; and increment a bearer ID of the one or more bearer IDs based at least in part on a second non-cellular connection.

14. An apparatus for wireless communication at a first network entity, comprising:

one or more memories; and one or more processors, coupled to the one or more memories, individually or collectively configured to cause the first network entity to:

receive, from a first gateway entity, a connection setup request for a first cellular connection between a user equipment (UE) and the first network entity, wherein the first gateway entity is a device located in a core network, and wherein the first network entity is a central unit;

transmit a connection setup message to the UE via the first gateway entity and a first access point;

receive a connection complete message from the UE via the first gateway entity and the first access point;

transmit, to the first gateway entity, a UE context modification request;

receive, from the first gateway entity, a UE context modification response; and receive, from a second network entity, a transfer message based on the UE context modification request, the transfer message being associated with a second cellular connection to the UE, wherein the second network entity is a distributed unit.

15. The apparatus of claim 14, wherein the connection setup message includes one or more of a gateway entity identifier (ID), a UE ID, a message type ID, or a cell radio network temporary identifier (C-RNTI).

16. The apparatus of claim 14, wherein the one or more processors are individually or collectively configured to cause the first network entity to establish one or more of security or a bearer with the UE via one or more non-access stratum (NAS) operations.

17. The apparatus of claim 14, wherein the one or more processors are individually or collectively configured to cause the first network entity to transmit a Layer 1 (L1) configuration, a medium access control (MAC) configuration, or a radio link control (RLC) configuration to the UE.

18. The apparatus of claim 14, wherein the first cellular connection, for a control plane, is established at:

a radio resource control (RRC) layer and a packet data convergence protocol (PDCP) layer between the UE and the first network entity via the first access point and the first gateway entity, and an F1 application protocol (F1-AP) layer, a stream control transmission protocol (SCTP) layer, an internet protocol (IP) layer, and a Layer 1 (L1) and Layer 2 (L2) layer between the first gateway entity and the first network entity, and wherein the first cellular connection, for a user plane, is established at:

a service data adaptation protocol (SDAP) layer and the PDCP layer between the UE and the first network entity via the first access point and the first gateway entity, and a general packet radio system (GPRS) tunneling protocol user plane (GTP-U) layer, a user datagram protocol (UDP) layer, the IP layer, and the L1 and L2 layer between the first gateway entity and the first network entity.

19. The apparatus of claim 14, wherein the one or more processors are individually or collectively configured to cause the first network entity to:

receive a transfer message from the first gateway entity with a measurement report from the UE;

transmit a UE context setup request to a second network entity that is a distributed unit;

receive a UE context setup response from the second network entity;

transmit a UE context release message to the first gateway entity.

20. The apparatus of claim 14, wherein the one or more processors are individually or collectively configured to cause the first network entity to:

receive a transfer message from the first gateway entity with a measurement report from the UE;

transmit a UE context setup request to a second gateway entity;

receive a UE context setup response from the second gateway entity;

transmit a UE context modification request to the first gateway entity;

receive a UE context modification response from the first gateway entity;

receive a transfer message from the second gateway entity, the transfer message being associated with a second non-cellular connection to the UE; and transmit a UE context release message to the first gateway entity.

21. The apparatus of claim 14, wherein the one or more processors are individually or collectively configured to cause the first network entity to:

receive a transfer message from a second gateway entity with a measurement report from the UE;

transmit a UE context setup request to the second gateway entity;

receive a UE context setup response from the second gateway entity;

transmit a UE context modification request to a second network entity;

receive a UE context modification response from the second network entity;

receive a transfer message from the second gateway entity, the transfer message being associated with a second non-cellular connection to the UE; and transmit a UE context release message to the second network entity.

22. The apparatus of claim 14, wherein the one or more processors are individually or collectively configured to cause the first network entity to transmit initial values for one or more bearer identifiers (IDs) that are associated with a non-cellular connection.

23. An apparatus for wireless communication at a first gateway entity, comprising:
one or more memories; and
one or more processors, coupled to the one or more memories, configured to cause the first gateway entity to:
forward, from a user equipment (UE) to a first network entity, a connection setup request for a first cellular connection between the UE and the first network entity, wherein the first network entity is a central unit, and wherein the first gateway entity is a device located in a core network;
forward a connection setup message from the first network entity to the UE via an access point;
forward a connection complete message from the UE to the first network entity;
receive, from the first network entity, a UE context modification request;
transmit, to the first network entity, a UE context modification response;
establish a second cellular connection between the UE and a second network entity via the first gateway entity based on the UE context modification request, wherein the second network entity is a distributed unit.

24. The apparatus of claim 23, wherein a first non-cellular connection, for a control plane, is established at an internet protocol (IP) layer and a packet data convergence protocol (PDCP) layer between the first gateway entity and a first access point,
wherein the first cellular connection, for the control plane, is established at an F1 application protocol (F1-AP) layer, a stream control transmission protocol (SCTP) layer, an IP layer, and a Layer 1 (L1) and Layer 2 (L2) layer between the first gateway entity and the first network entity,
wherein the first non-cellular connection, for a user plane, is established at a service data adaptation protocol (SDAP) layer and the PDCP layer between the first gateway entity and the first access point, and
wherein the first cellular connection, for the user plane, is established at a general packet radio system (GPRS) tunneling protocol user plane (GTP-U) layer, a user datagram protocol (UDP) layer, the IP layer, and the L1 and L2 layer between the first gateway entity and the first network entity.

25. The apparatus of claim 23, wherein the one or more processors are individually or collectively configured to cause the first gateway entity to:
forward a measurement report from the UE to the first network entity;
forward a random access channel message from the UE to the second network entity;
forward a random access response from the second network entity to the UE via a first access point; and
receive a UE context release message from the first network entity.

26. The apparatus of claim 23, wherein the one or more processors are individually or collectively configured to cause the first gateway entity to:
forward a measurement report from the UE to the first network entity;
receive a UE context modification request from the first network entity;
transmit a UE context modification response to the first network entity;
forward a reconfiguration complete message from the UE to a second gateway entity; and
receive a UE context release message from the first network entity.

27. The apparatus of claim 23, wherein the one or more processors are individually or collectively configured to cause the first gateway entity to:
receive a UE context setup request from the first network entity;
transmit a UE context setup response to the first network entity;
receive a reconfiguration complete message from the UE via a second access point, the reconfiguration complete message being associated with a third cellular connection between the UE and the first network entity via a second gateway entity; and
transmit a transfer message to the first network entity based at least in part on the reconfiguration complete message.

28. The apparatus of claim 23, wherein the one or more processors are individually or collectively configured to cause the first gateway entity to:
receive a UE context setup request from the first network entity;
transmit a UE context setup response to the first network entity;
receive a reconfiguration complete message from the UE via a second access point, the reconfiguration complete message being associated with a third cellular connection between the UE and the first network entity via a second gateway entity; and
transmit a transfer message to the first network entity based at least in part on the reconfiguration complete message that is associated with the third cellular connection.

29. An apparatus for wireless communication at a second network entity, comprising:
one or more memories; and
one or more processors, coupled to the one or more memories, configured to cause the second network entity to:
receive a user equipment (UE) context setup request for a first cellular connection between a UE and the second network entity, wherein the second network entity is a distributed unit;
transmit a UE context response to a first network entity, wherein the first network entity is a central unit;
receive a random access channel message from the UE via a first access point and a first gateway entity, wherein the first gateway entity is a device located in a core network;
transmit a random access response to the UE via the first gateway entity and the first access point;
receive a reconfiguration complete message from the UE via the first access point and the first gateway entity, the reconfiguration complete message being associated with a second cellular connection to the second network entity;
transmit a transfer message to the first network entity based at least in part on the reconfiguration complete message; and
establish the second cellular connection to the UE via the first gateway entity based on the transfer message.

30. The apparatus of claim 29, wherein the one or more processors are individually or collectively configured to cause the second network entity to establish one or more of security or a bearer with the UE via one or more non-access stratum (NAS) operations.

* * * * *